US011838624B2

(12) United States Patent
Rosensweig et al.

(10) Patent No.: US 11,838,624 B2
(45) Date of Patent: Dec. 5, 2023

(54) SYSTEMS AND METHODS OF REMOTE VIDEO PRODUCTION, AND APPARATUS THEREFOR

(71) Applicant: Wavemaker Creative, Inc., Hollywood, CA (US)

(72) Inventors: Ira Rosensweig, Los Angeles, CA (US); Dallas Sterling, Burbank, CA (US); Jeremy Fernsler, Glendale, CA (US)

( * ) Notice: Subject to any disclaimer, the term of this patent is extended or adjusted under 35 U.S.C. 154(b) by 0 days.

(21) Appl. No.: 18/083,158

(22) Filed: Dec. 16, 2022

(65) Prior Publication Data

US 2023/0199305 A1   Jun. 22, 2023

Related U.S. Application Data

(63) Continuation of application No. 17/318,752, filed on May 12, 2021, now Pat. No. 11,533,421.

(Continued)

(51) Int. Cl.
*H04N 23/661* (2023.01)
*H04N 5/262* (2006.01)
*H04N 7/14* (2006.01)
*H04R 1/08* (2006.01)
*H04R 3/00* (2006.01)

(Continued)

(52) U.S. Cl.
CPC ......... *H04N 23/661* (2023.01); *G02B 27/144* (2013.01); *G03B 15/03* (2013.01); *G06F 1/1605* (2013.01); *H04N 5/2628* (2013.01); *H04N 7/142* (2013.01); *H04N 7/15* (2013.01); *H04N 23/56* (2023.01); *H04N 23/63* (2023.01); *H04N 23/80* (2023.01); *H04R 1/08* (2013.01);

(Continued)

(58) Field of Classification Search
CPC .................................................... H04N 23/661
USPC .................................................... 348/207.11
See application file for complete search history.

(56) References Cited

U.S. PATENT DOCUMENTS

| 10,491,785 | B1* | 11/2019 | Arnot ................... H04N 5/2222 |
| 2007/0182812 | A1* | 8/2007 | Ritchey ............... H04N 23/698 348/36 |
| 2014/0098215 | A1* | 4/2014 | Dinis ..................... B63C 11/02 348/81 |

OTHER PUBLICATIONS

Quicklink Video Over IP Solutions, scraped by Archive.org on Nov. 14, 2017, retrieved Sep. 7, 2023 from https://web.archive.org/web/20171114110442/https://www.quicklink.tv/products/studio-in-a-box/.

(Continued)

*Primary Examiner* — Joel W Fosselman
(74) *Attorney, Agent, or Firm* — Kane Kessler, P.C.; Barry E. Negrin

(57) ABSTRACT

A portable remote controlled video production apparatus and method are provided, as is a teleprompter/Interrotron integrated with a camera. A computer is mounted in a rigid cage, the computer having a local portion of remote access remote control software. A camera is fixedly mounted in the cage in communication with the computer; either the camera or the computer have camera control software running thereon. A monitor is fixedly mounted in the cage in front of the camera and parallel to the lens axis; the monitor is in communication with the computer. A beamsplitter is fixedly mounted in the cage in front of the lens reflecting light from the monitor towards a front of the cage. The camera and computer are controllable remotely via a remote portion of the remote access remote control software running on a remote computer communicating with the local portion of the remote access remote control software.

20 Claims, 24 Drawing Sheets

Related U.S. Application Data

(60) Provisional application No. 63/023,555, filed on May 12, 2020.

(51) Int. Cl.
*G03B 15/03* (2021.01)
*G02B 27/14* (2006.01)
*G06F 1/16* (2006.01)
*H04N 23/56* (2023.01)
*H04N 23/63* (2023.01)
*H04N 23/80* (2023.01)
*H04N 7/15* (2006.01)

(52) U.S. Cl.
CPC ....... *H04R 3/00* (2013.01); *G03B 2215/0521* (2013.01); *G03B 2215/0567* (2013.01); *H04R 2499/11* (2013.01)

(56) References Cited

OTHER PUBLICATIONS

Mobile Viewpoint IQ Sports Producer—Create live professional sports productions without onsite camera team.
IQ Video Solutions—IQ vPilot AI driven Automated Studio Multi-camera studio creating professional productions without the need for camera people or director.

\* cited by examiner

SYSTEMS AND METHODS OF REMOTE VIDEO PRODUCTION, AND APPARATUS THEREFOR

RELATED APPLICATIONS

Priority is claimed from U.S. patent application Ser. No. 17/318,752 filed May 12, 2021 and entitled "SYSTEMS AND METHODS OF REMOTE VIDEO PRODUCTION, AND APPARATUS THEREFOR", which in turn claims priority from U.S. Provisional Patent Application No. 63/023,555 filed May 12, 2020 and entitled "SYSTEMS AND METHODS OF REMOTE VIDEO PRODUCTION, AND APPARATUS THEREFOR", the entirety of the latter of which is incorporated by reference herein.

BACKGROUND OF THE INVENTION

Field of the Invention

The invention is directed to video production, and more specifically to remote video production that can be controlled and monitored from another location, e.g., via the Internet.

Description of Related Art

Shooting video on location can be time consuming, difficult, and expensive. Costs mount as crew and equipment are driven, flown, or otherwise transported to the location. Further, setting up lighting, sound, teleprompters, and other related equipment can not only be time consuming but inconsistently done. Some shoots may turn out better than others simply because of the set up.

The above issues have become even more dire during the COVID-19 pandemic of 2020-21. Television shows, movies, commercials, etc. have been forced, like the overwhelming majority of workplaces, to minimize person-to-person contact. Unfortunately, either crews are still being sent to the talent's location in violation of social distancing orders, or the talent is simply attempting to produce their own segments with whatever equipment is available, e.g., a cellphone camera. The former jeopardizes the health and well-being of the talent and crew, while the latter yields subpar production value. Potential problems include poor video quality, shaky video, unflattering wide-angle lens effects, bad lighting, poor audio quality, sub-optimal performance (because of no director present), incorrect timing (because of no director present), incorrect messaging (because of no director present), among others.

In the case of having talent use whatever they have on hand, often they use a videoconferencing program like Zoom on their laptop or phone. Talent will have to record the video on their local device, or someone will record the image and sound remotely over the internet. While this method is easier for talent, it has many downsides, including poor image and sound quality, bad lighting, etc. Moreover, there is no ability for filmmakers to remotely control any equipment or settings in this case. The benefit of doing it this way is ease, but talent is still responsible for filming themselves, and the results are often poor.

Attempts to ship gear to the talent's location to boost production value have been met with limited success, as the talent often does not have the requisite skill set to assemble it. Drop kits, or various pieces of professional equipment that are sent to talent, have to be assembled and connected in order for talent to shoot themselves while being remotely monitored. Equipment typically includes a camera, a tripod, lights, microphones, perhaps a teleprompter too, as well as a computer. Various components may or not be able to be controlled remotely. Someone needs to connect everything, then connect everything to a computer and the Internet. It's a laborious setup, often beyond the ability of the talent.

Accordingly, there is a long-felt need to be able to provide an easily portable video production solution that provides excellent production value while still being simple to use and easy to set up from the talent end, with the ability for professional technicians to monitor and control the equipment remotely.

SUMMARY OF THE INVENTION

The invention is a professional, comprehensive remote video production system, method, and apparatus that integrates a cinema camera, cinema light, beamsplitter glass that can serve as a direct-address teleprompter/Interrotron, off-axis teleprompter/Interrotron, at least one but preferably two microphones, and client monitoring and feedback technology, all of which can be controlled remotely, e.g., over the Internet.

An integrated set of equipment is housed in a shock-resistant/cushioned case and sent to the talent location. Once the lid of the case is removed and the lighting system deployed, very little else need be set up by the talent. The system includes at least one remote access module (e.g., a cellular hotspot or a modem) that is adapted to communicate with remote computers. One of those computers is operated by a technician who can control all of the equipment remotely, adjusting the lighting, sound, and camera settings, playing back video, and switching what the talent sees on the beamsplitter or off-axis monitor between teleprompter, Interrotron and other options. Other remote computers can be manned by other crew members, such as a director who can communicate directly with talent on the Interrotron, a teleprompter operator who remotely runs prompting software, as well as other crew members such as producers and clients who can give live feedback on the session. The talent's performance can be recorded locally in high quality digital formats, streamed, or the like.

The invention combines the ease of talent using their own equipment with the professional quality of a full drop kit or professional equipment. Every component one would need for remote production is already in the inventive unit, pre-connected and configured to each other, and positioned for use once the lid is lifted (there is nothing you need to move around or set up). It is entirely plug and play.

The invention combines a camera, microphones, and a light along with a direct address teleprompter along with remote access software that enables full remote control via an internet connection. Additionally, the invention combines a camera, monitor, and beamsplitter in a pre-set fixed arrangement as an out-of-the-box teleprompter integrated with a camera.

The inventive unit arrives at talent's doorstep in a preferably disinfected military-grade case containing a 6k cinema camera, expandable 3-foot wide LED light capable of dimming and color temperature changes, direct address teleprompter/Interrotron, detachable 2nd teleprompter/Interrotron monitor for off-axis eyelines, and two professional microphones. Each component works together in a fully integrated system that is completely remotely controllable. On-camera talent simply opens the box and plugs it in, and the unit automatically connects over the Internet to a remote team of filmmakers who control every component in the box. This is achieved in one embodiment with cellular bonding, without needing to connect to the user's home Wi-Fi network, eliminating concerns of compromised security. Clients and crew join a video conference where they view a beautiful, high-resolution feed from the camera and participate as if they were on set, while the director appears on the integrated Interrotron to direct the talent, creating an incredibly seamless experience for all involved. High-resolution video, up to 6K, is recorded inside the box, but clients can also choose to livestream the shoot.

The invention includes a portable remote controlled video production apparatus that includes a rigid cage; and a computer mounted in the cage. The computer has a local portion of remote access remote control software operationally present on the computer. A camera is fixedly mounted in the cage in communication with the computer, at least one of the camera and the computer having camera control software operationally present thereon configured to control the camera, the camera having a lens. The camera and the computer are controllable remotely via a remote portion of the remote access remote control software operationally present on a remote computer communicating with the local portion of the remote access remote control software. Preferably, a first monitor may be fixedly mounted in the cage in front of the camera and parallel to an axis of the lens, the first monitor in communication with the computer and receiving display information from the computer. A beamsplitter is preferably fixedly mounted in the cage in front of the lens, the beamsplitter reflecting light from the monitor towards a front of the cage. The camera films through the beamsplitter. Preferably, the beamsplitter is mounted at a 45 degree angle to the monitor.

Preferably, the inventive apparatus may include a light source attached to the cage and in communication with the computer, the computer having light control software operationally present thereon configured to control the light source. The light source is controllable remotely via the remote portion of the remote access remote control software operationally present on the remote computer communicating with the local portion of the remote access remote control software. Preferably, the light source may include at least one light panel having a plurality of LEDs. Preferably, the light panel may be hingedly attached to the cage and is configured to fold upward in a use position and fold downward substantially flush with the cage in a storage position. Preferably, the at least one light panel may include at least a central light panel and a side light panel hingedly attached to the central light panel. Preferably, the central light panel and the side light panel may be separately controllable. Preferably, the light panel may include a securing mechanism releasably securing the light panel to the cage in the use position.

Preferably, the inventive apparatus may include a communication module in communication with the computer configured to enable the computer to communicate with the internet. The communication module includes at least one of a router or a cellular modem.

Preferably, the inventive apparatus may include a hood, fixedly disposed around the lens between the camera and the beamsplitter, shielding the lens from ambient light.

Preferably, the inventive apparatus may include a signal processor mounted in the cage in communication with the computer and the first monitor, the signal processor processing a video signal from the computer to the monitor to flip an image to be presented on the monitor at least one of horizontally or vertically or both.

Preferably, the inventive apparatus may include a plurality of leveling feet respectively attached to bottom locations of the cage via respective set screws each accessible for turning from respective top locations of the case.

Preferably, the inventive apparatus may include at least one microphone attachable to the apparatus and in communication with the computer, the computer having microphone control software operationally present thereon configured to control the microphone. The microphone is controllable remotely via the remote portion of the remote access remote control software operationally present on the remote computer communicating with the local portion of the remote access remote control software.

Preferably, the inventive apparatus may include a second monitor in communication with the computer and receiving display information from the computer, the second monitor configured to be mountable off-axis from the lens.

The invention also includes a method of remote controlled video production, having the following steps: providing a rigid cage; mounting a computer in the cage, the computer having a local portion of remote access remote control software operationally present thereon; fixedly mounting a camera in the cage in communication with the computer, at least one of the camera and the computer having camera control software operationally present thereon configured to control the camera, the camera having a lens; and remotely controlling the camera control software and the computer via a remote portion of the remote access remote control software operationally present on a remote computer in communication with the local portion of the remote access remote control software.

The inventive method preferably may also include the steps of: fixedly mounting a first monitor in the cage in front of the camera and parallel to an axis of the lens, the first monitor in communication with the computer and receiving display information from the computer; fixedly mounting a beamsplitter in the cage in front of the lens, the beamsplitter reflecting light from the monitor towards a front of the cage; filming through the beamsplitter with the camera.

The inventive method preferably may also include the steps of: providing a light source attached to the cage, the computer having light control software operationally present thereon configured to control the light source; and remotely controlling the light control software via the remote portion of the remote access remote control software operationally present on the remote computer communicating with the local portion of the remote access remote control software.

The inventive method preferably may also include the step of enabling the computer to communicate with the internet by providing a communication module in communication with the computer, the communication module including at least one of a router or a cellular modem.

The inventive method preferably may also include the step of processing a video signal from the computer to the monitor, the processing step including the step of flipping an image to be presented on the monitor at least one of horizontally or vertically or both.

The inventive method preferably may also include the steps of: providing at least one microphone, the computer having microphone control software operationally present thereon configured to control the at least one microphone; and remotely controlling the microphone control software via the remote portion of the remote access remote control software operationally present on the remote computer communicating with the local portion of the remote access remote control software.

The inventive method preferably may also include the steps of: providing a second monitor in communication with the computer and receiving display information from the computer; and mounting the second monitor off-axis from the lens.

The invention also includes a portable integrated teleprompter/Interrotron apparatus having a rigid cage and a camera fixedly mounted in the cage, the camera having a lens. A first monitor is fixedly mounted in the cage in front of the camera and parallel to an axis of the lens, the first monitor receiving display information and displaying the information. A beamsplitter is fixedly mounted in the cage in front of the lens, the beamsplitter reflecting light from the monitor towards a front of the cage. The camera films through the beamsplitter. The beamsplitter may be preferably mounted at a 45 degree angle to the monitor.

The inventive teleprompter/Interrotron apparatus preferably may include a hood, fixedly disposed around the lens between the camera and the beamsplitter, shielding the lens from ambient light. Preferably, the inventive teleprompter/Interrotron apparatus preferably may include a signal processor mounted in the cage in communication with the first monitor, the signal processor processing a video signal to the monitor to flip an image to be presented on the monitor at least one of horizontally or vertically or both.

The invention also includes a portable remote controlled video production apparatus having a rigid cage and a computer mounted in the cage, the computer having a local portion of remote access remote control software operationally present on the computer. A remotely accessible camera is fixedly mounted in the cage remotely communicatable with the internet, the camera having camera control software operationally present thereon configured to control the camera, the camera having a lens. At least one video production peripheral device is in communication with the computer, the computer having peripheral control software operationally present thereon configured to control the at least one video production peripheral device. The computer is controllable remotely via a remote portion of the remote access remote control software operationally present on a remote computer communicating with the local portion of the remote access remote control software.

Preferably, the inventive apparatus may include a first monitor fixedly mounted in the cage in front of the camera and parallel to an axis of the lens, the first monitor in communication with the computer and receiving display information from the computer; and a beamsplitter fixedly mounted in the cage in front of the lens, the beamsplitter reflecting light from the monitor towards a front of the cage. The camera films through the beamsplitter.

The at least one video production peripheral device may preferably include a light source attached to the cage and in communication with the computer, the computer having light control software operationally present thereon configured to control the light source. The light source is controllable remotely via the remote portion of the remote access remote control software operationally present on the remote computer communicating with the local portion of the remote access remote control software.

The at least one video production peripheral device may preferably include at least one microphone attachable to the apparatus and in communication with the computer, the computer having microphone control software operationally present thereon configured to control the microphone. The microphone is controllable remotely via the remote portion of the remote access remote control software operationally present on the remote computer communicating with the local portion of the remote access remote control software.

The inventive apparatus may include a second monitor in communication with the computer and receiving display information from the computer, the second monitor configured to be mountable off-axis from the lens.

DETAILED DESCRIPTION OF THE INVENTION AND DRAWINGS

Description will now be given with reference to the attached FIGS. 1-24. It should be understood that these figures are exemplary in nature and in no way serve to limit the scope of the invention, which is defined by the claims appearing hereinbelow and equivalents thereof.

The following is a list of components shown in FIGS. 1-9 in the inventive remote video production apparatus 100. It should be noted that specific hardware or software components can be substituted with alternate components made by the same manufacturer or other manufacturers without departing from the scope of the invention.

Computer 110—e.g., Mac Mini

Figure 24:
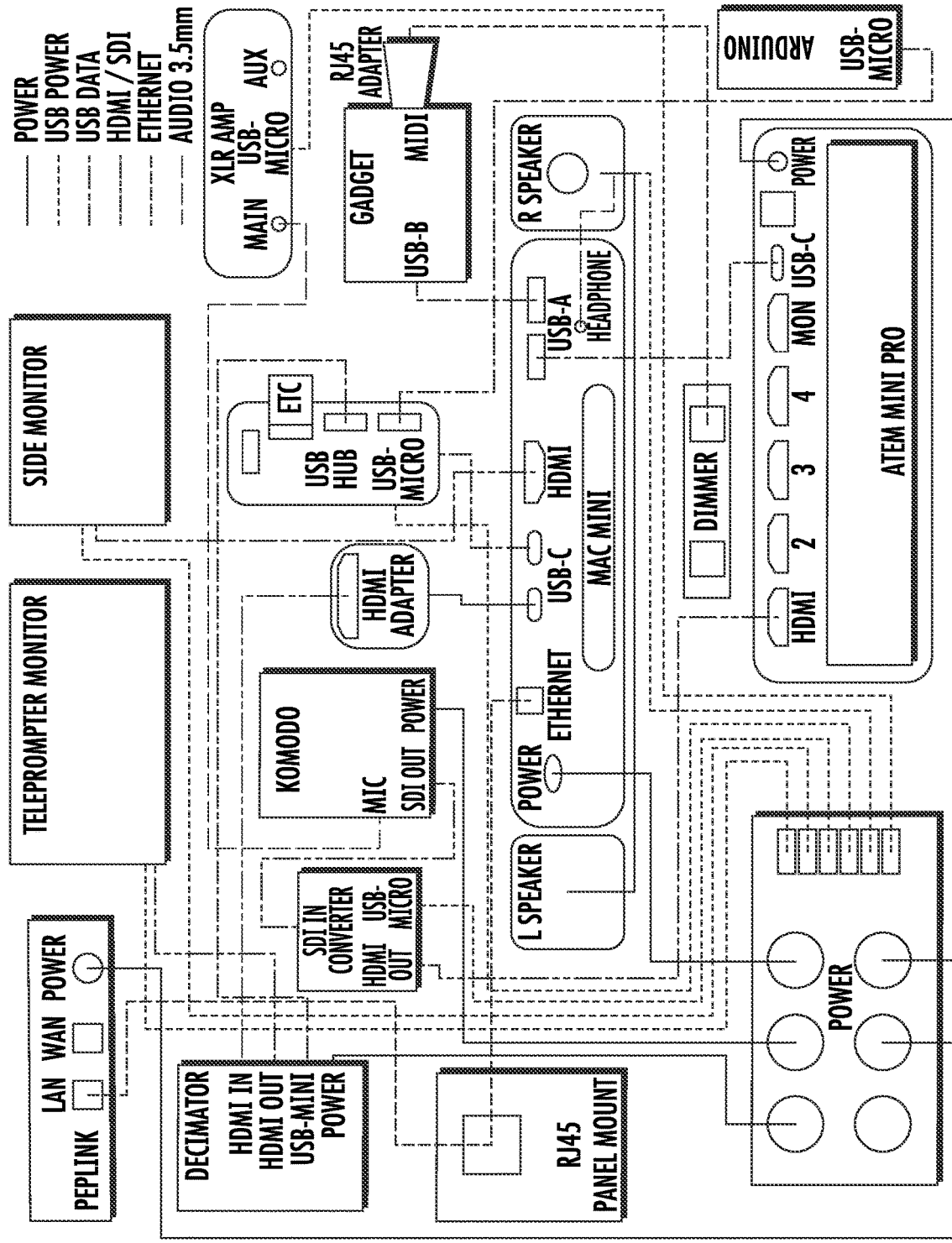
FIG. 24 is an exemplary embodiment of a connection map of the invention utilizing a RED Komodo camera.

Camera 120—e.g., Blackmagic Pocket Cinema Camera 6k (connection map in FIG. 23) or RED Komodo (connection map in FIG. 24)

Lens 122—e.g., Canon EF 35 mm f/1.4 L II USM
Microphone 130—e.g., Short Shotgun Microphone Audio-Technica AT875R
Microphone 140—e.g., Lavalier Sanken COS-11D Omni Lavalier Microphone
Solid State Hard Drive 150—e.g., Delkin Jugglers or Samsung 2 TB T5
Light 160—e.g., 3' tri-panel light made from Litegear LED Lightcards (additional lighting elements can be employed, connected to the computer, and controlled in the same manner as light 160, as described below)
Dimmer 162—e.g., Litegear DMX Dimmer Pack E-Control
Controller 164—e.g., ETC Gadget II DMX Controller 5-pin XLR to USB
Lighting Software Dongle 166—e.g., ETC Nomad
Camera Controller/Webcam converter 124—e.g., Blackmagic ATEM Mini Pro Switcher
Video Capture Card 126—e.g., Blackmagic UltraStudio Mini Recorder (can be eliminated if playback done remotely)
Arduino Microcontroller 128—Sparkfun ESP32 Thing Microcontroller
Monitor 1 170—e.g., GeChic 15.6" 1503H
Monitor 2 180—e.g., GeChic 15.6" 1503H
Cross Converter 172—e.g., Decimator MD-HX
Beamsplitter 190—e.g., custom cut acrylic, glass, or the like
Keyboard/Trackpad 200—e.g., iClever BK08 Foldable Keyboard/Trackpad
Speakers 210—e.g., ARVICKA Computer Speakers
Cellular Hotspot 1 220—e.g., Inseego MiFi 8800L 4G LTE Mobile Hotspot—Verizon
Cellular Hotspot 2 230—e.g., Netgear Nighthawk MR1100 Mobile Hotspot (T-Mobile, AT&T) (Note: instead of separate hotspots 220 and 230, a single modem is preferably employed such as Peplink Max Transit Duo.)
Case 250—e.g., SKB R Series 1919-14 Case—modified with latches (not shown) and 1" of 2.2 #closed cell polyethylene 256 on all interior surfaces, having base 252 and lid 254
Light Power Supply 260—e.g., Litegear Desktop, 12V, DC 16 A, 240 W
Teleprompter Hood 192 which closes off the space between the camera lens and beamsplitter 190 thereby shielding the camera lens from ambient light
Surge Protector 270—e.g., Orico 8 Outlet/5 USB Surge Protector w/5 ft cord
Component Cage 300 having front frame 302 and rear frame 304 connected by side bars.
Rotatable leveler feet 306 are preferably provided on the bottom corners of cage 300, preferably threadedly connected thereto, to enable fine adjustment of the angle of the cage. Preferably, the leveler feet are respectively attached to bottom locations of front frame 302 and rear frame 304 via respective set screws 308 that pass through front frame 302 and rear frame 304 and are each accessible for turning from respective top locations 309 of front frame 302 and rear frame 304. That way, one need not lift up the entire unit to adjust the angle thereof, one can do so by turning the top portions of the set screws accessible at the top of the unit while leaving the unit in situ.
Light flipstand 310
Mic clips (not shown, optional)
Risers (not shown, optional)
Wedges (not shown, optional)

Apparatus 100 includes over 20 different A/V and computer components that are housed in a secure cage 300 and shipped in a military grade case 250. Once it arrives, the on-camera talent removes the lid, revealing the interior components, and plugs it into an outlet. All components are powered on, aside from the main computer unit (a Mac Mini) and at least one but optionally two cellular hotspots, which may need to be manually powered on. In a preferred embodiment, a router will also auto-boot upon receiving power. Once booted, the computer auto-connects to a bonded cellular network (if available, it can also bond to any WiFi network or ethernet). The mission control computer automatically connects to unit 100 through a piece of software called Team Viewer (though any remote client software will work), anywhere in the world it can get Internet service. A module of Team Viewer is installed in the local apparatus 100 on the computer, and another module of Team Viewer is installed on the remote computer being used by the remote operator. "Easy Access" is granted to the remote operator preferably only once, and then Team Viewer need not be run again locally. Once the local computer in apparatus 100 is powered on, the remote computer can automatically detect it as long as the local computer is connected to the internet. The operator at mission control can then remotely control the Mac Mini in unit 100, which is used to operate all the other components.

The operator then initiates a videoconference with unit 100, the director, the teleprompter operator, clients, and anyone else who wants to join the session, where they all can view the image and sound being recorded on the camera of the unit. In one embodiment, the system uses Zoom software to videoconference, but any other teleconferencing software can be used. The operator at mission control is able to control camera 120, light 160, levels of microphones 130 and/or 140, and the content being shown to the talent on monitor 170 via reflection off of beamsplitter 190, as well as the content being shown to the talent on monitor 180. Each is described below in more detail.

1. Camera 120. In one embodiment, unit 100 includes a Blackmagic 6k Pocket Cinema Camera, but other cameras from different brands can be used (e.g., RED Komodo). The camera is connected to the computer through, in no particular order:
a) an HDMI video capture card (e.g., the Blackmagic Ultrastudio Mini Recorder 126 in FIG. 9), which along with software (e.g., Blackmagic Media Express), enables the video signal to be recorded onto the computer's internal hard drive in many different formats for purposes of playing back footage recorded (note: in a preferred embodiment, playback is controlled remotely, thereby obviating the need for both mini recorder 126 and its associated Media Express software); and/or
b) a Blackmagic ATEM Mini Pro switcher 124 (FIG. 4), which allows Zoom to see the Blackmagic camera as a webcam (though other devices allow the same functionality). The switcher also allows some control of the camera; and/or
c) an Arduino compatible microcontroller 128 (e.g., a Sparkfun ESP32 Thing Microcontroller), which enables Bluetooth control of the camera through a piece of custom software to be described below. This control includes the ability to trigger start and stop recording of the camera onto a connected solid state hard drive, enabling the highest quality video (better quality than the footage being recorded to the computer's hard drive). The inventors' software improves upon the Blackmagic ATEM Control Software in the following ways:
  i) Ability to see focus peaking in multiple colors, as well as control of the level of focus peaking;
  ii) Ability to adjust 2 channels of audio coming into the camera;
  iii) Ability to play back any clip recorded on the solid state drive;
  iv) Ability to see the actual camera settings on the interface.
d) Bluetooth using a second piece of custom software. This software is somewhat of a backup to the software that utilizes the Arduino and doesn't have as robust functionality. Functionality includes the ability to trigger start and stop recording of the camera onto a connected solid state hard drive, as well as things that can't be done on the Blackmagic ATEM Control Software, including:
  i) Ability to activate focus peaking in multiple colors;
  ii) Ability to play back the last clip shot from the camera.

2. Light 160. In one embodiment, light 160 includes a 3-foot wide, 3-panel cinema light, made from LiteGear LiteCards, that stands up and folds out of the top of the box, using a DMX controller and ETC Nomad software. The color temperature and dimming of each panel of the light can be controlled separately. In one embodiment, the light panel array 160 includes a central panel 160B flanked by wings or side panels 160A which are hingedly attached to central panel 160B at hinges 160C. The entire array is hingedly attached to frame 300 via supports 160D. Magnets 161 on supports 160D connect with magnets 163 on front frame 302 to secure light array 160 into place. Preferably, the light is oriented so that its non-deployed position faces upwards; in this way, it can be unfolded even while parallel to the ground, facing up, to provide indirect bounce light.

3. Microphones. Unit 100 preferably includes at least one but preferably two microphones: a short shotgun microphone 130, as well as a lavalier microphone 140, using the software controlling the Arduino and ATEM switcher.

Using the videoconferencing app, the operator is also able to control what image is shown on the integrated beamsplitter 190, which preferably sits permanently and fixedly at a 45 degree angle in front of the camera 120 within frame 300. Anything can be displayed by the computer on beamsplitter 190 via reflection from monitor 170, but best uses of it include:

1) As a teleprompter. A remote teleprompter operator can run any teleprompting software (e.g., Power Prompter) on their computer, and by sharing their screen on Zoom, the script will appear in front of the talent;
2) As an Interrotron, which displays the director's face, so the talent can directly interact with them.
3) As a vanity monitor, so talent can see themselves as the camera sees them.

Anyone on the videoconference can also appear on the beamsplitter from monitor 170, and the operator can also share any piece of media on it, whether still or moving, using the videoconferencing application's share screen function.

Since beamsplitter 190 flips an image horizontally, the main monitor 170 of unit 100 sits facing up at it, and the image on the monitor gets reversed horizontally by a video scaling device called the Decimator 172. Monitor 180, stored in the side of unit 100, can be detached and moved to an optimal position for viewing, such as sitting on a desk. This monitor has all of the same functionality as the frontal monitor, and can display all of the same things that can be displayed on the beamsplitter, for an off-axis eyeline.

In the case where talent needs to input anything into unit 100, it also preferably comes with a small, foldable keyboard 200 with integrated track pad. Small computer speakers 210 are positioned at the bottom of the box so talent can hear the director or anyone else who needs to speak to them, as well as playback of video, which can also be done remotely by the operator at mission control. Feedback and echo issues are preferably avoided via software, e.g., Rogue Amoeba Loopback software to properly route the audio.

Once the session is over, the lid is placed back on unit 100, and it is shipped back to the production company, where the (preferably solid state) hard drive connected to the camera is removed, which is then ready for editing or color correction. Alternately, if footage is needed immediately after the shoot, a remote file transfer of the footage can be initiated over the Internet.

Figure 1:
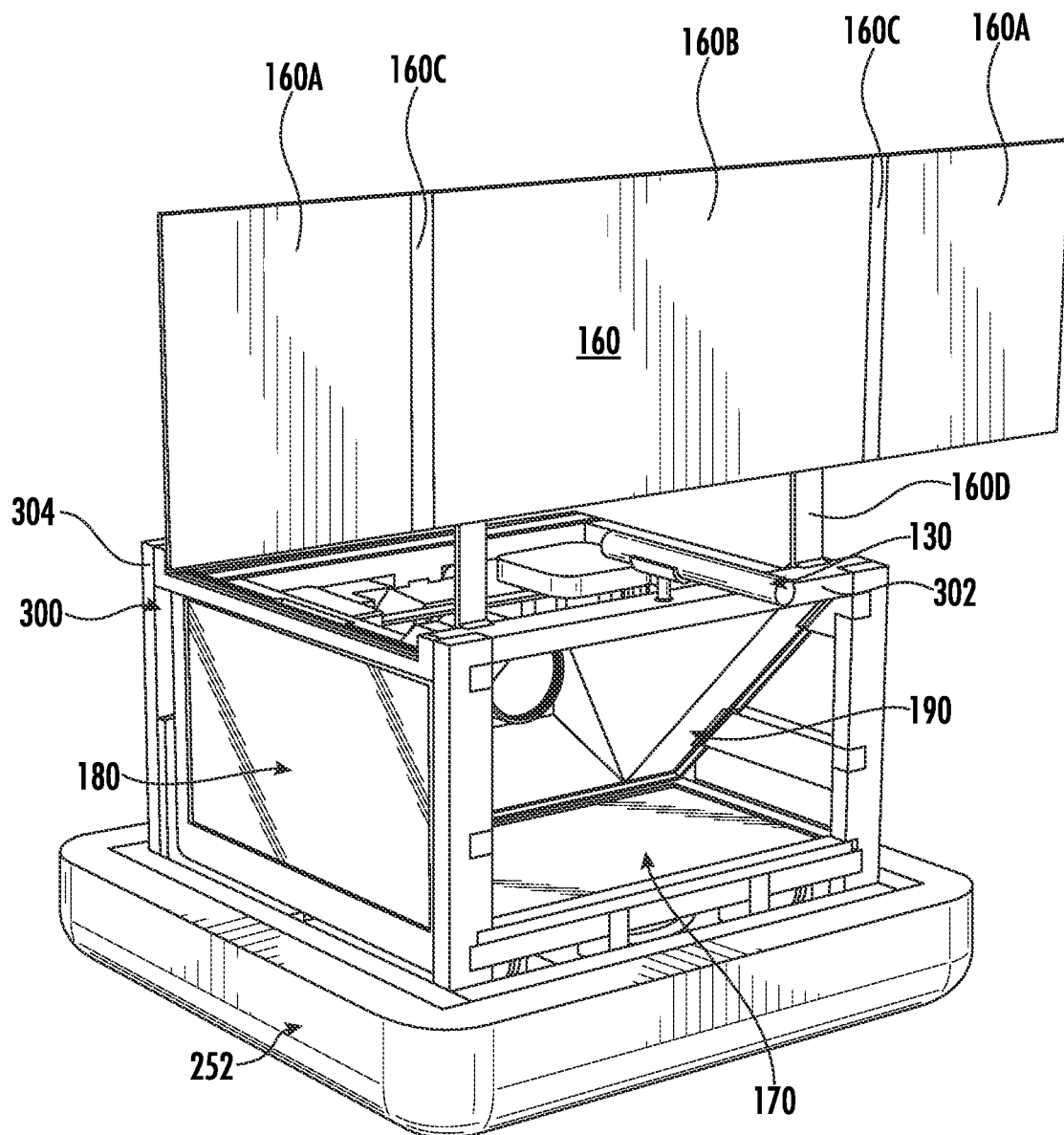
FIG. 1 is a front left perspective view of a remote video production apparatus in accordance with an embodiment of the invention in record configuration.
Figure 2:
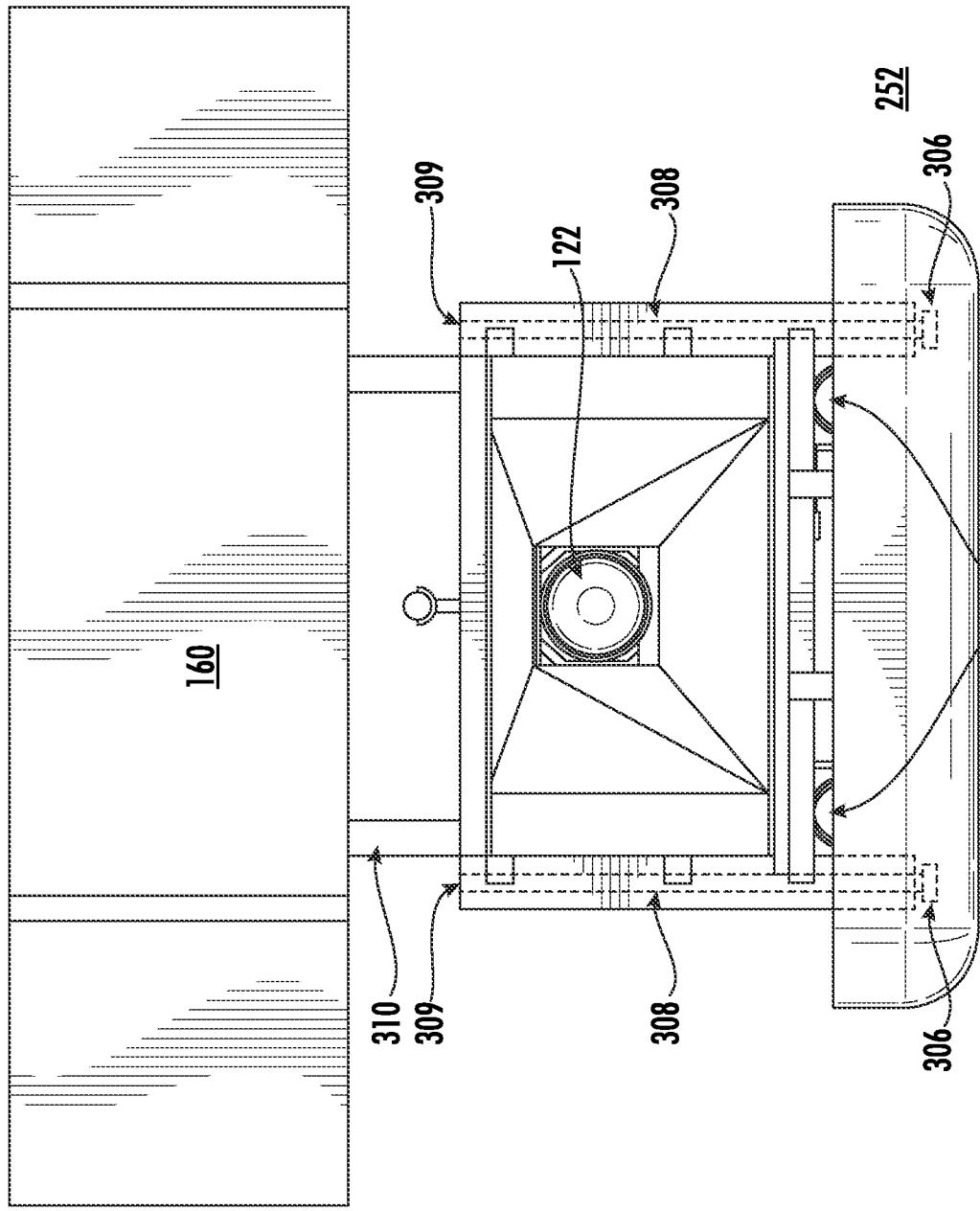
FIG. 2 is a front elevation view of the remote video production apparatus of FIG. 1 in record configuration.
Figure 3:
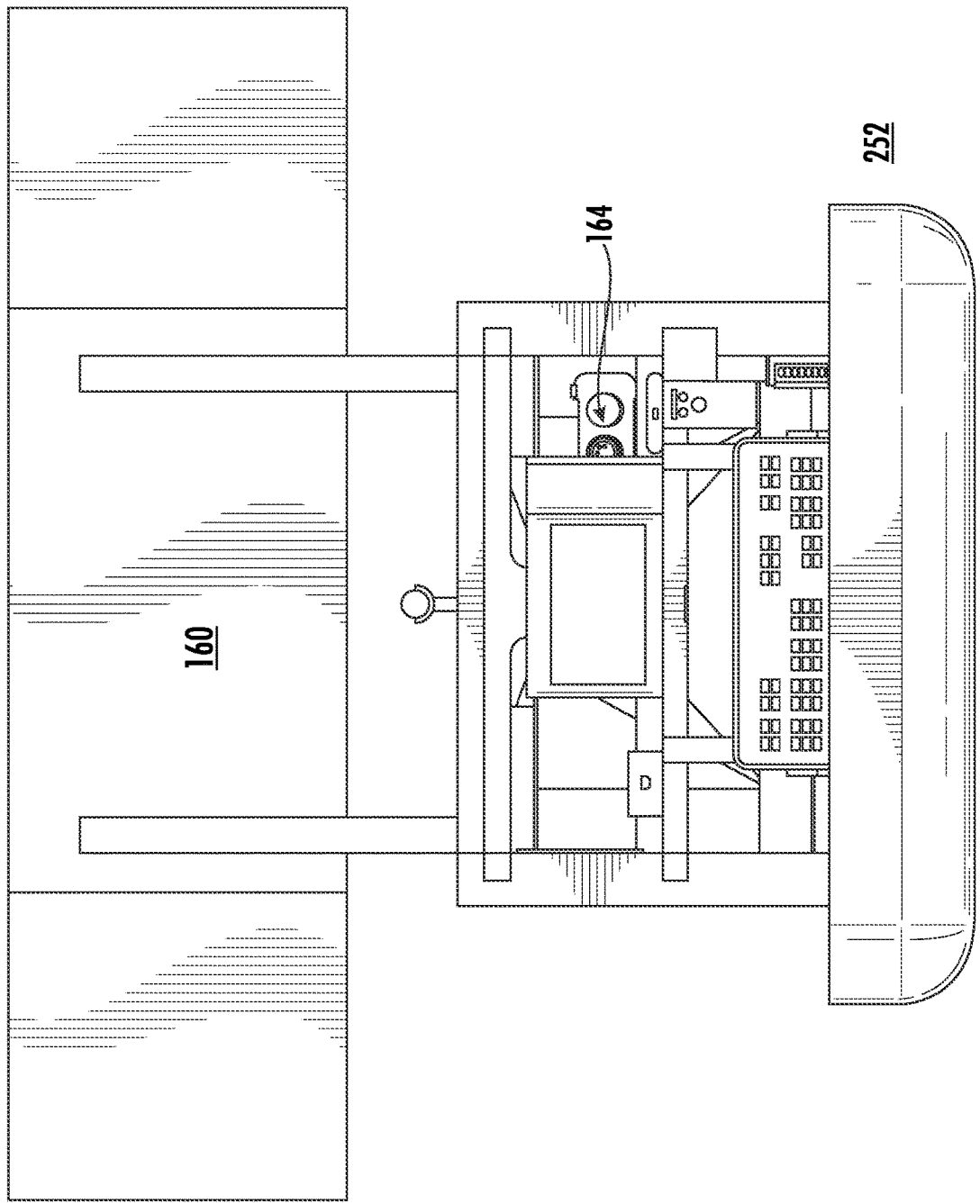
FIG. 3 is a rear elevation view of the remote video production apparatus of FIG. 1 in record configuration.
Figure 4:
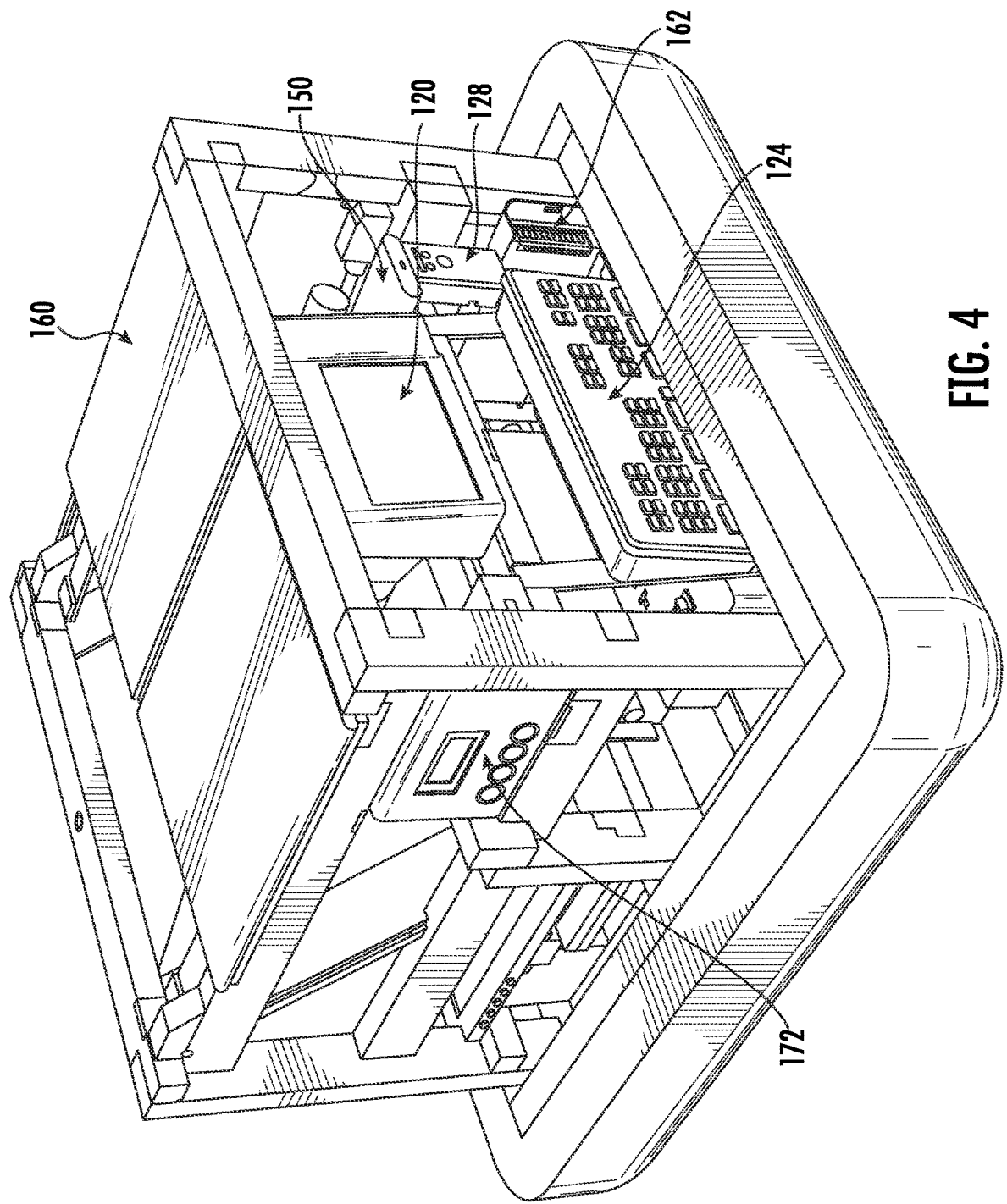
FIG. 4 is a rear right perspective view of the remote video production apparatus of FIG. 1 in a storage configuration.
Figure 5:
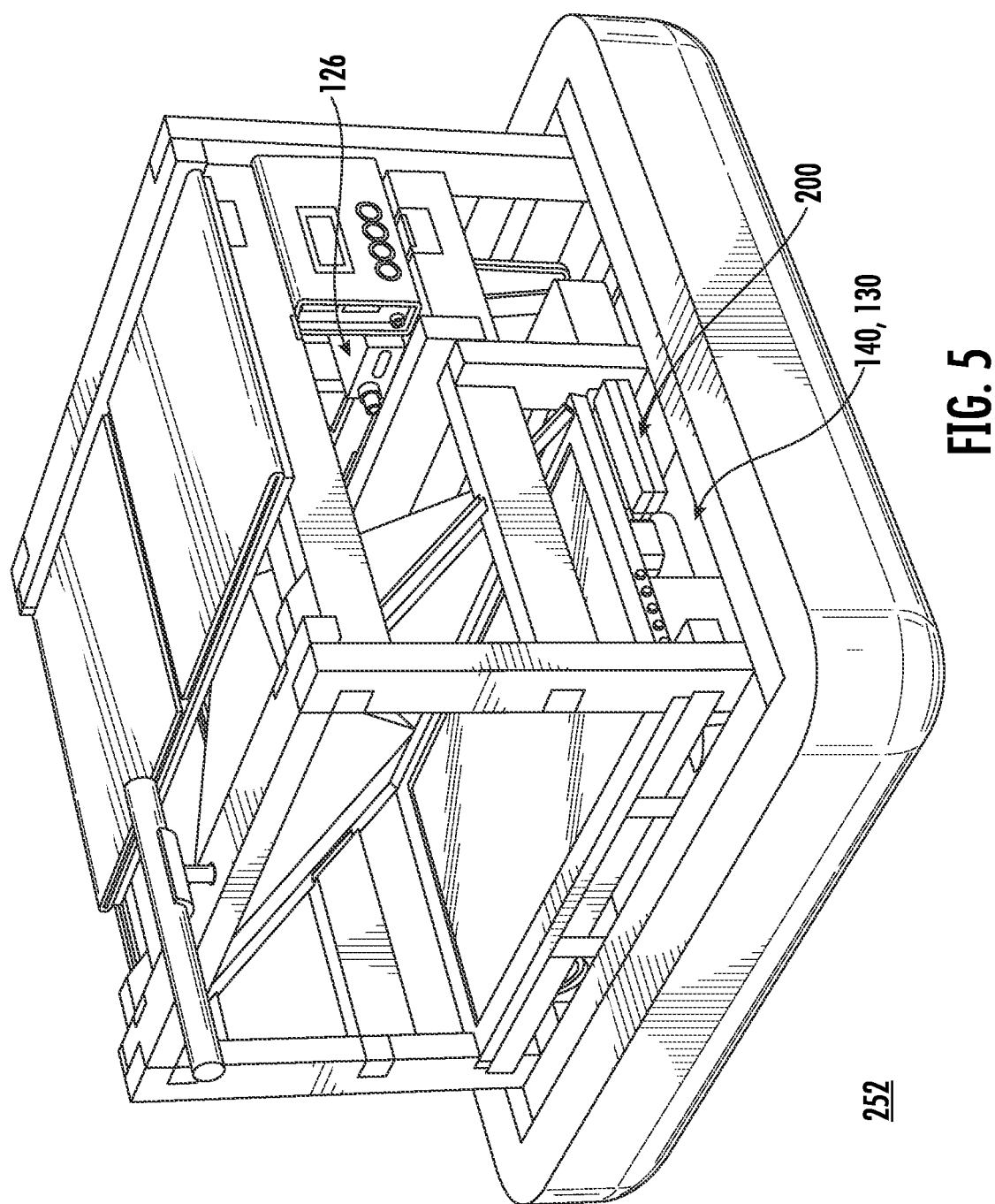
FIG. 5 is a front right perspective view of the remote video production apparatus of FIG. 1 in a storage configuration.
Figure 6:
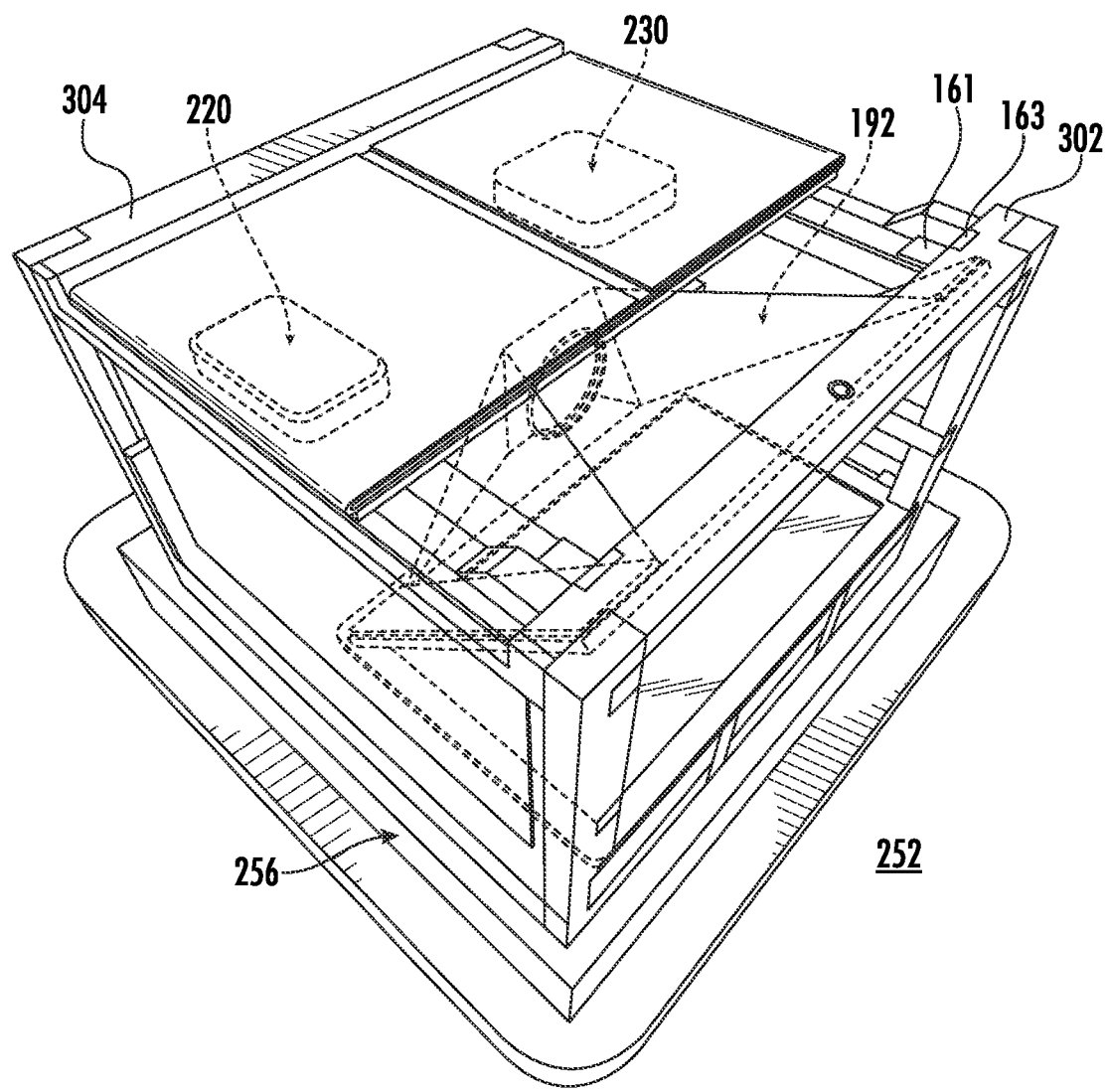
FIG. 6 is a top left perspective view of the remote video production apparatus of FIG. 1 in a storage configuration.
Figure 7:
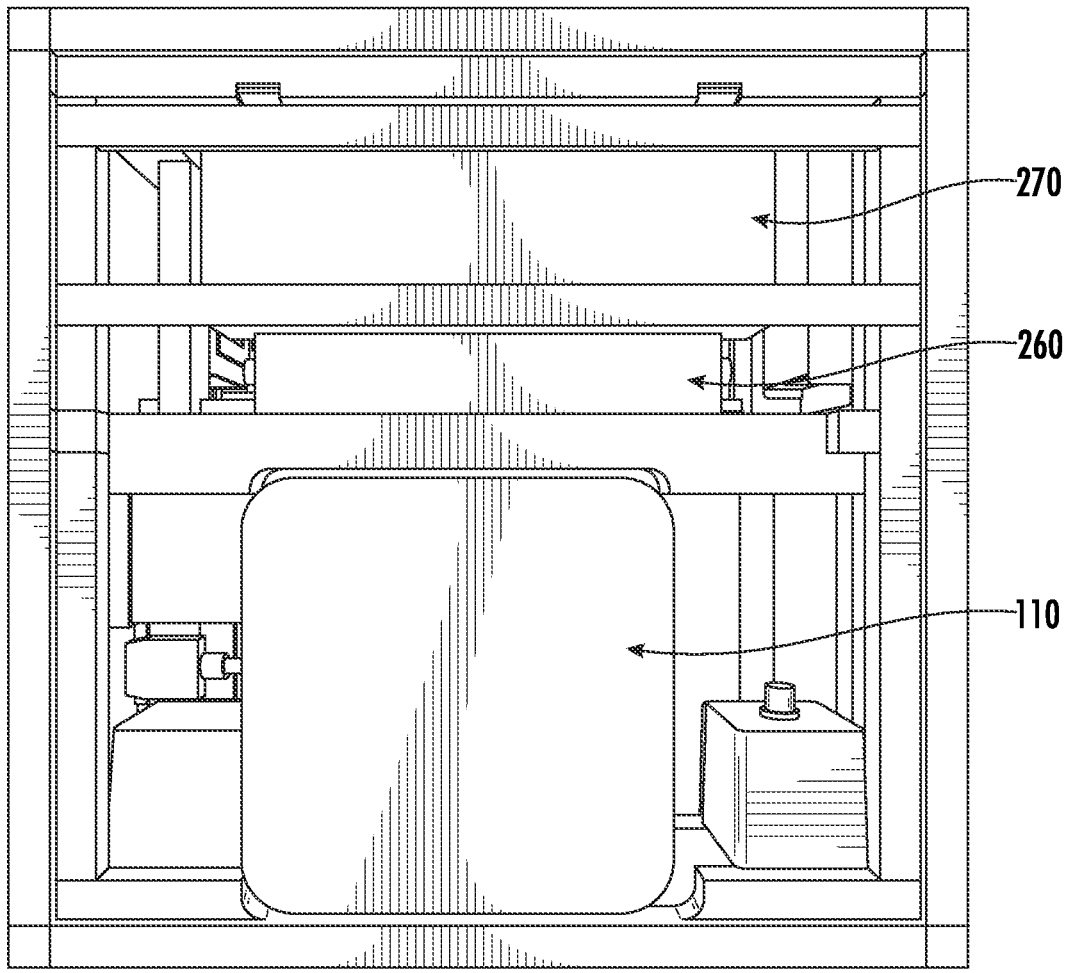
FIG. 7 is a bottom plan view of the remote video production apparatus of FIG. 1 with the base of the case removed for clarity.
Figure 8:
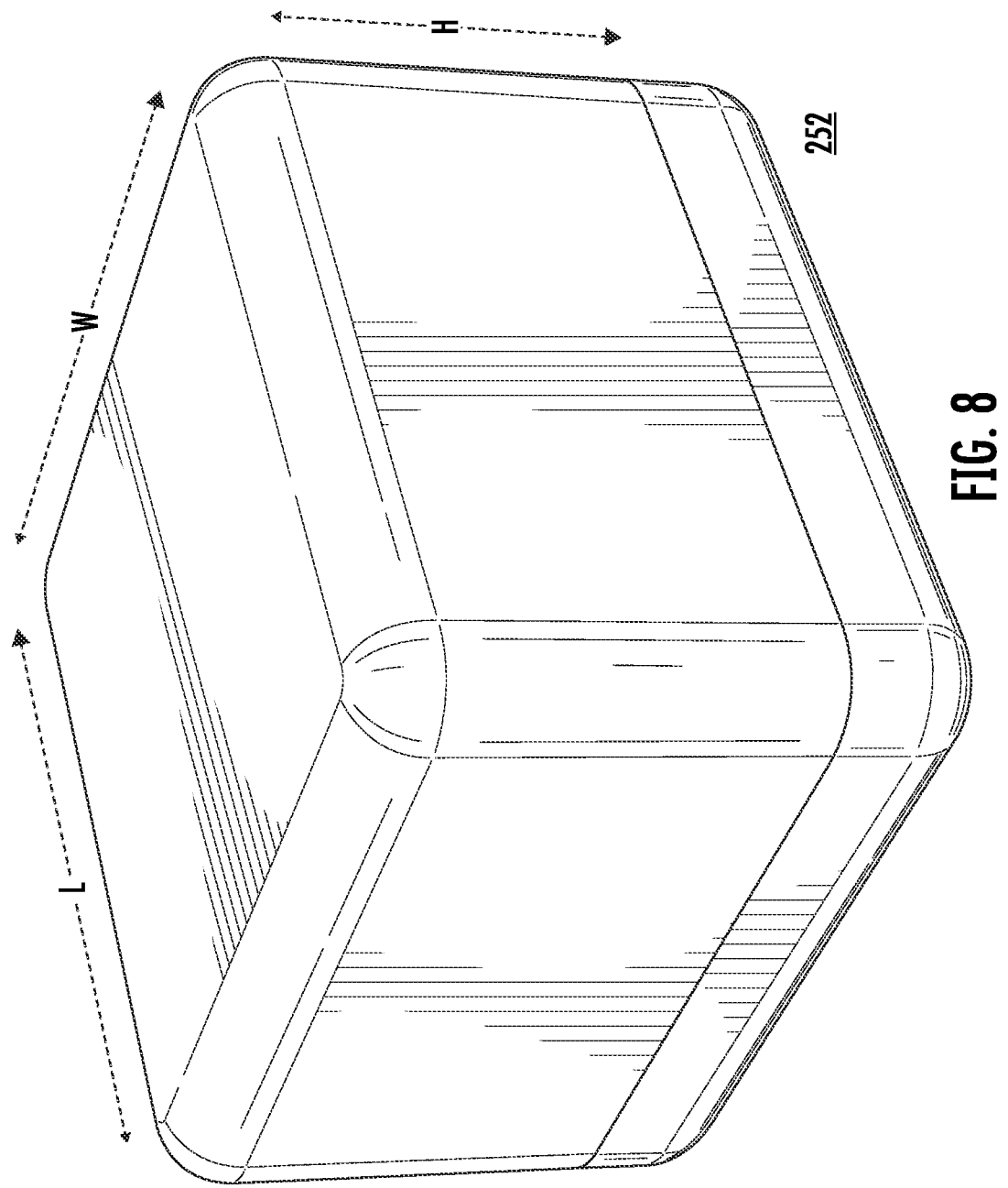
FIG. 8 is a left perspective view of an exterior case of the remote video production apparatus in accordance with an embodiment of the invention.
Figure 9:
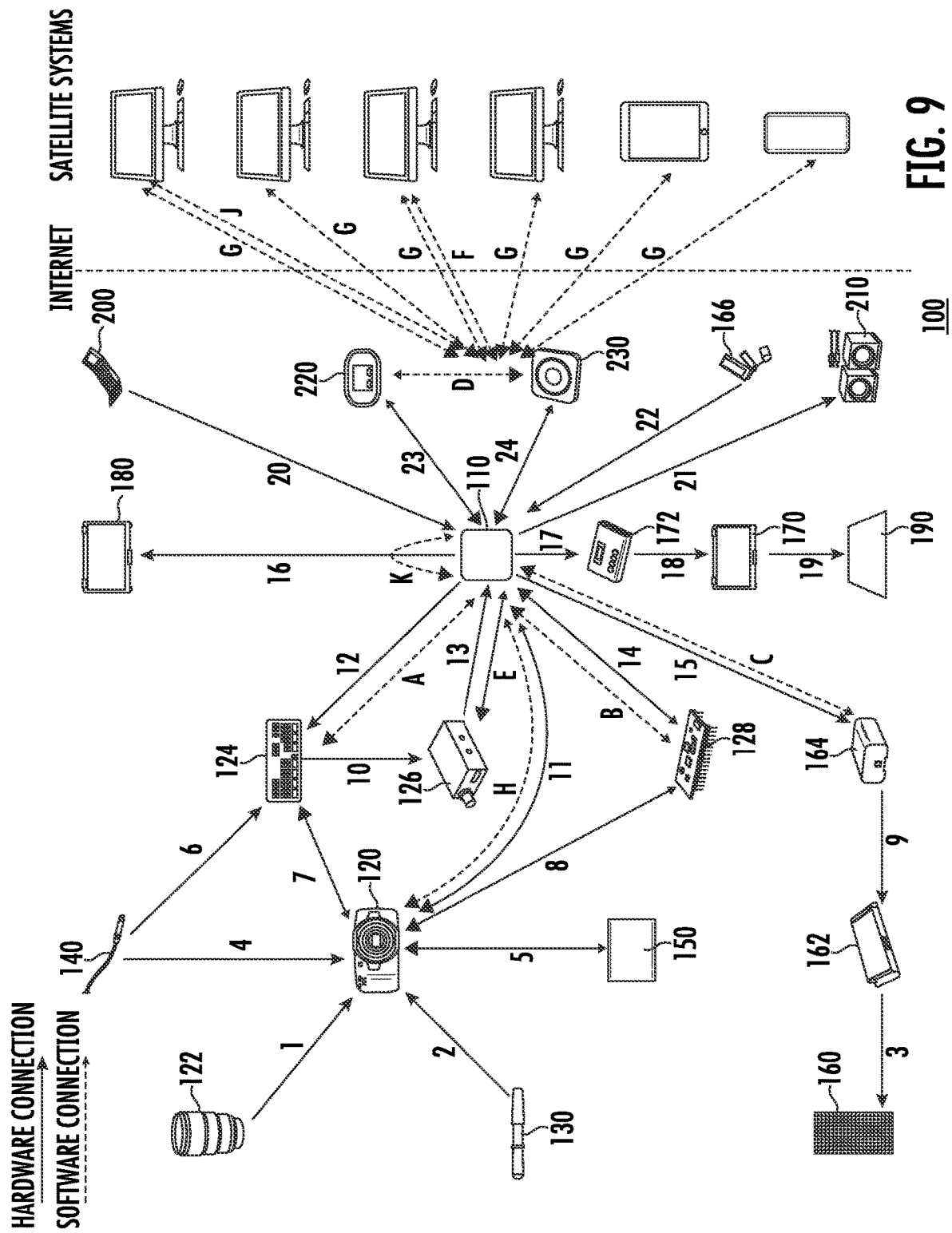
FIG. 9 is a schematic of a workflow/connection map of the various components of a remote video production apparatus in accordance with an embodiment of the invention.
Figure 10:
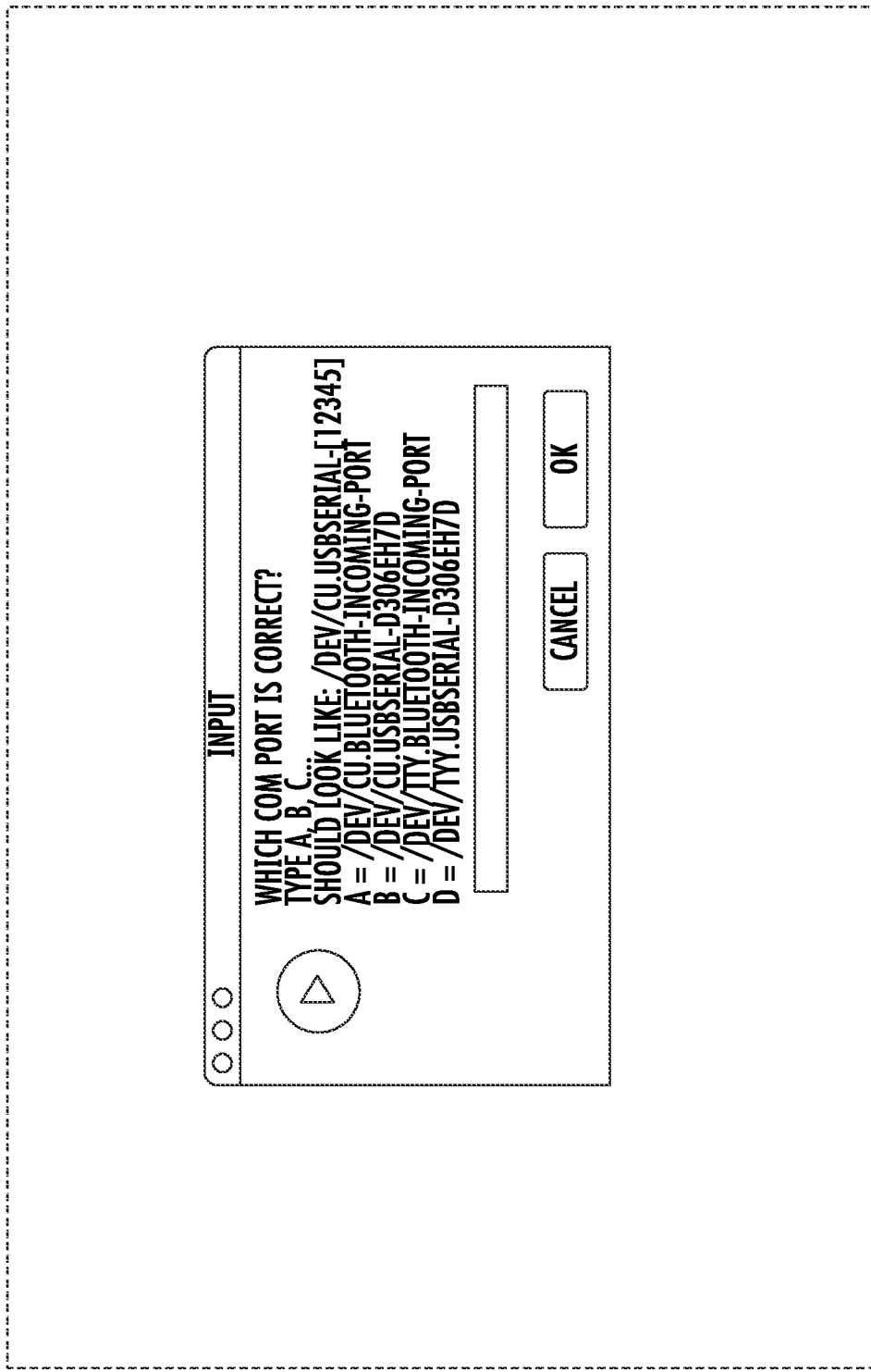
FIGS. 10-15 are exemplary screenshots of a custom camera control software interface in accordance with an embodiment of the invention.
Figure 11:
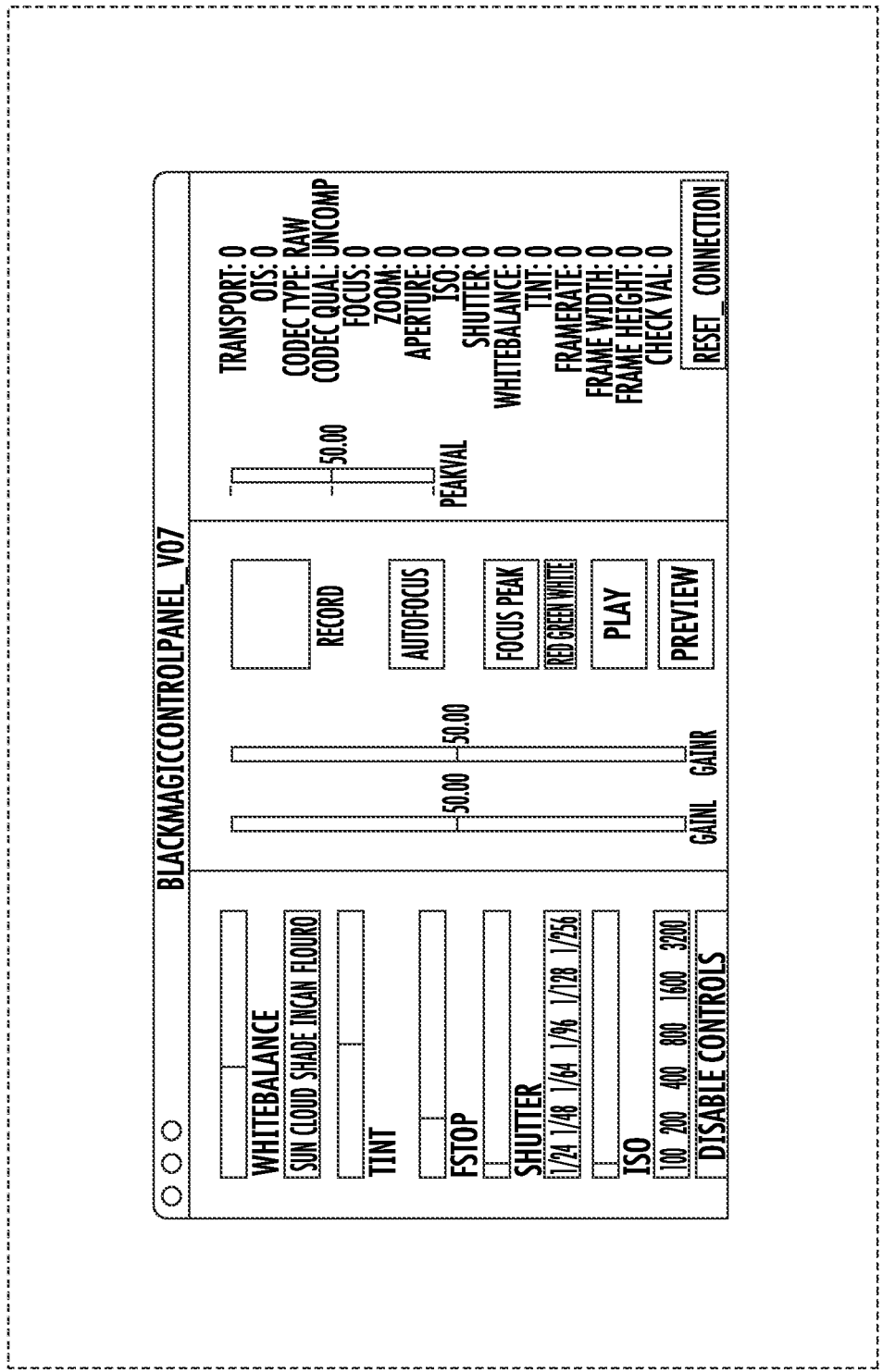
Figure 12:
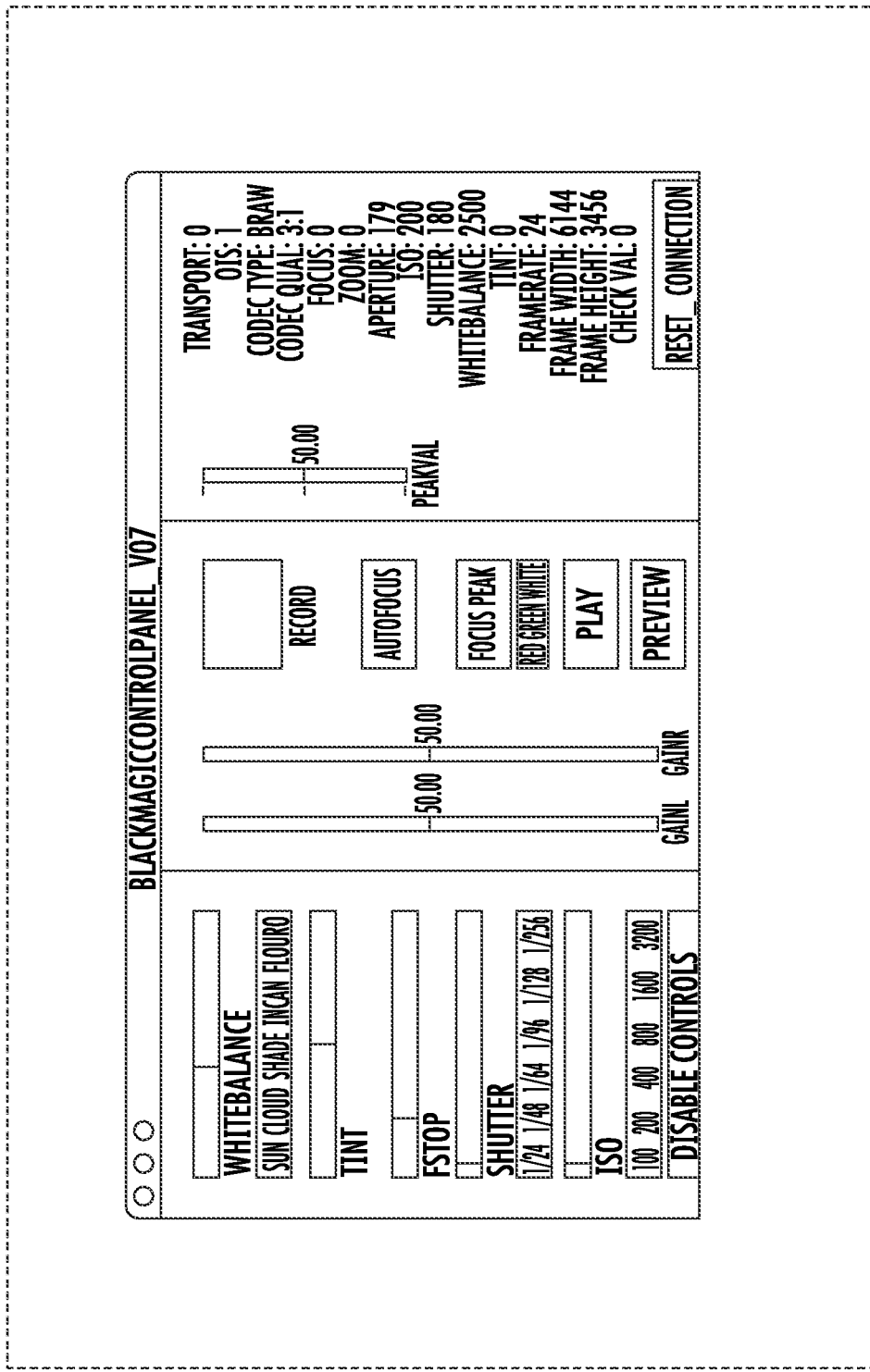
Figure 13:
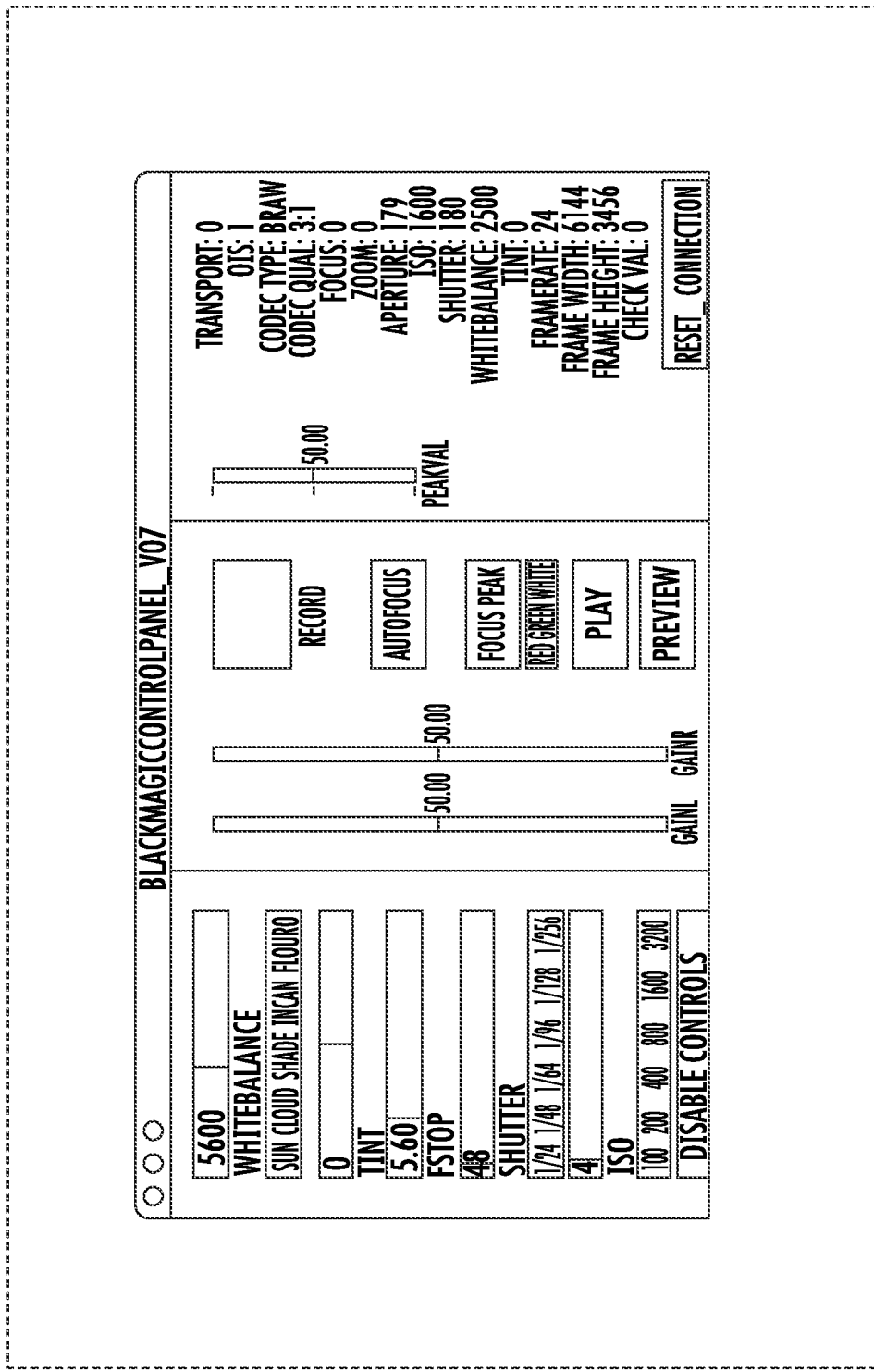
Figure 14:
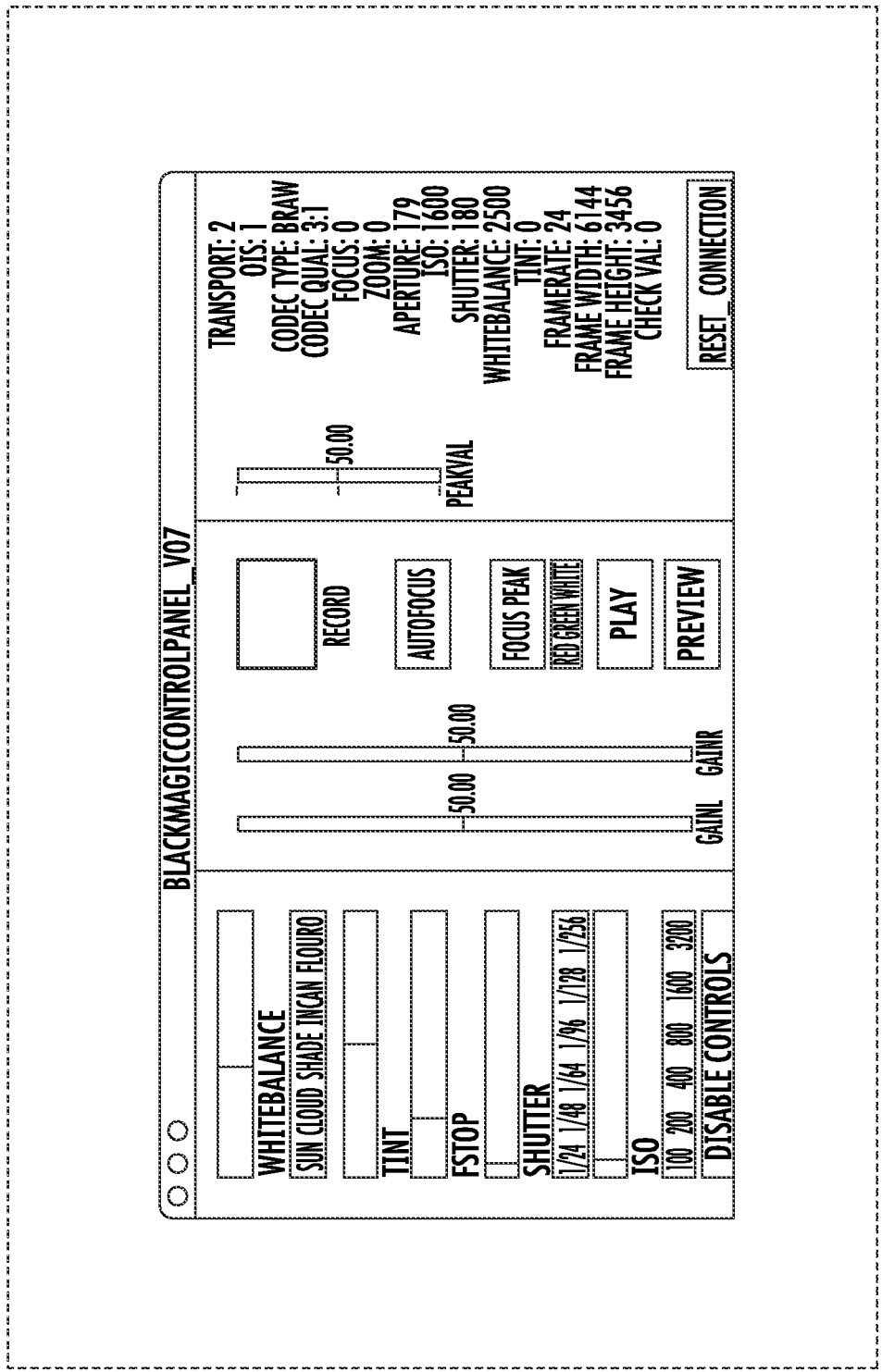
Figure 15:
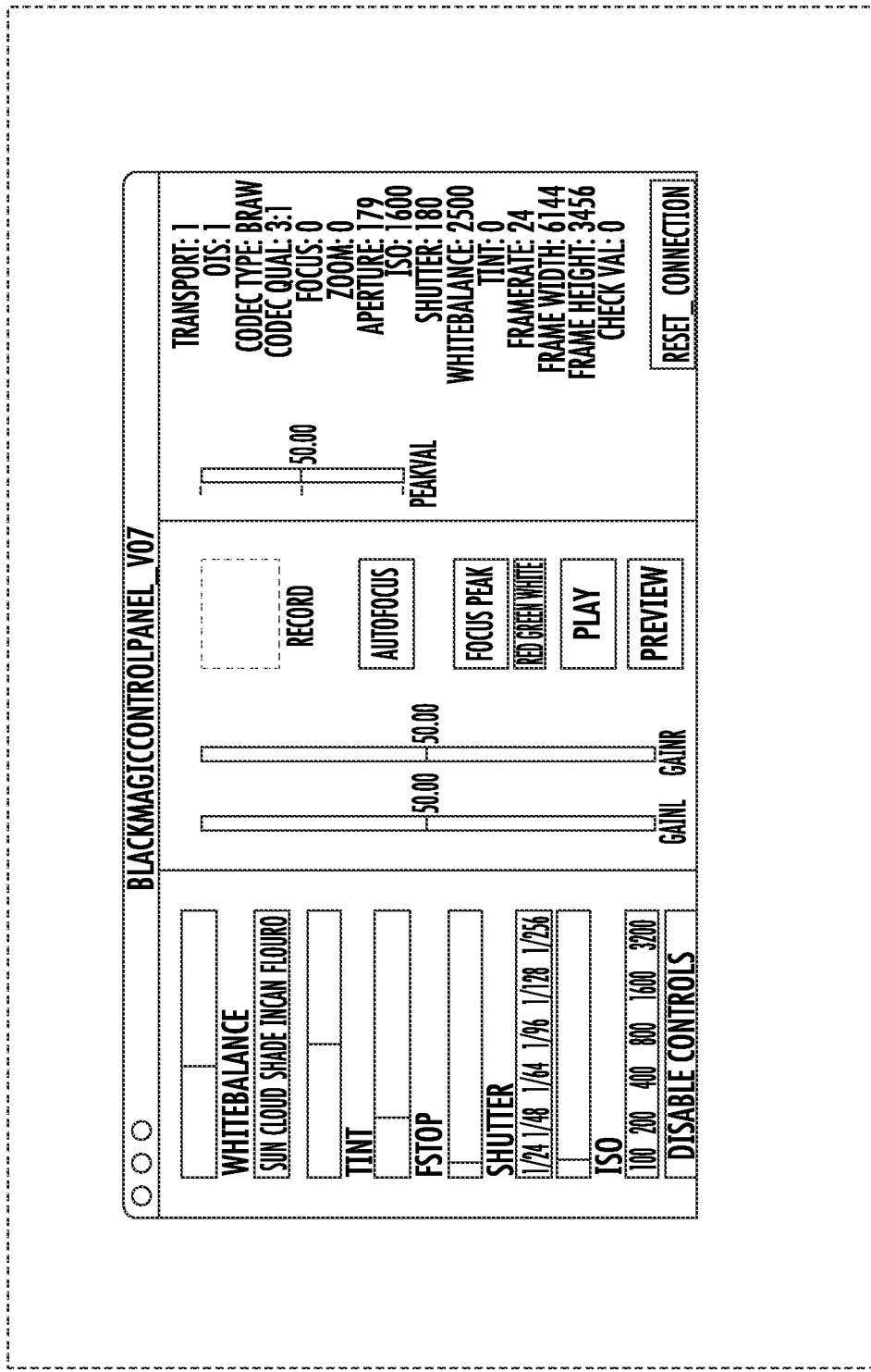

FIG. 9 is a schematic of a workflow/connection map of the various components of unit 100. Hardware connections are depicted with solid arrows, and software connections are depicted with dashed arrows. The connections are described hereinbelow. It should be noted that specific hardware or software components can be substituted with alternate components made by the same manufacturer or other manufacturers without departing from the scope of the invention.

Hardware Connections
1. EF Mount—connects lens 122 to camera 120.
2. XLR out adapted to Mini-XLR in—connects shotgun microphone 130 to camera 120.
3. 18/3 wire—connects light array 160 to DMX Dimmer Control 162.
4. XLR out split to ⅛" adapter—connects lavalier microphone 140 to camera 120.
5. USB-C—connects 2 TB SSD 150 to camera 120—allows highest quality, Blackmagic RAW 3:1 codec recording, and clips recorded to be played back at high resolution.
6. XLR out split to ⅛" adapter—connects lavalier microphone 140 to ATEM switcher 124. (In a preferred embodiment, this connection is not made, and the XLR out of the lavalier is not split.)
7. HDMI—connects camera 120 and ATEM Switcher 124—allows camera control, passthrough of HDMI signal.
8. Bluetooth—connects camera 120 to Sparkfun Microcontroller 128—allows camera control, camera information to be transmitted.
9. DMX-SXM-CATS 5-Pin XLR Male to RJ45 Adapter—connects DMX Dimmer Control 164 to ETC Gadget II DMX Controller 162.
10. HDMI—connects ATEM switcher 124 to UltraStudio Mini Recorder 126—passes through HDMI signal. For embodiments in which Mini Recorder is not used, neither is this connection.
11. Bluetooth—optionally connects camera 120 to computer 110—allows camera control.
12. USB-C—connects ATEM switcher 124 to computer 110—allows computer to see the camera as a webcam.
13. Thunderbolt adapted to USB-C—in some embodiments, allows computer to record video files to the internal hard drive.
14. USB-C—connects Sparkfun Microcontroller 126 to computer 110—allows camera control, camera information to be transmitted.
15. USB—connects ETC Gadget Controller 164 to computer 110—allows computer to control lighting.
16. USB-C adapted to HDMI—connects Monitor 2 180 to computer 110—allows for a $2^{nd}$ computer display.

17. HDMI—connects Decimator Cross Converter 172 to computer 110—passes through HDMI signal.
18. HDMI—connects Decimator Cross Converter 172 to Monitor 1 170—allows the image going to Monitor 1 to be mirror flipped.
19. Visible Light—"connects" Monitor 1 170 to beamsplitter 190—which then de-mirror-flips the image for the talent.
20. Bluetooth—connects keyboard/trackpad 200 to computer 110—gives talent computer input control.
21. 3.5 mm stereo cable—connects speakers 210 to computer 110—allows user to hear all audio.
22. USB—connects ETC Nomad Dongle 166 to computer 110—allows ETC Nomad software to be used.
23. USB-C—connects Inseego Hotspot 220 to computer 110—tethers computer to Verizon cellular Internet connection.
24. USB-C—connects Netgear Hotspot 230 to computer 110—tethers computer to T-Mobile or AT&T cellular Internet connection.

Note: in some embodiments, hotspots 220 and 230 are replaced by a single modem that is provider-agnostic, thus obviating the above two USB-C connection 23 and 24. In those embodiments utilizing Peplink, it is connected to the computer by an ethernet cable through a panel mount.

Software Connections
   A. Blackmagic ATEM Software Control—Ability to control certain camera functions. This can be omitted if a different piece of hardware is used to turn the camera into a webcam—e.g., the custom coded camera control program B (described below) would be used instead.
   B. Custom Coded Camera Control—Ability to record trigger the camera as well as other camera functions. (Certain embodiments, like RED Komodo, do not use either the ATEM or the custom coded camera control to control the camera—the Komodo has a URL interface. Each camera has a different way it is controlled.) Further description of this software appears below.
   C. ETC Nomad—Ability to control light 160.
   D. Speedify—Bonds 2 or more Internet connections into a faster, more reliable VPN connection. Can be eliminated in some embodiments.
   E. Blackmagic Media Express—Ability to record video from the camera, which can be played back for everyone in the session. This can be substituted with other video capture software if a different video capture device is used, or can be omitted, if playback is achieved by recording the live stream of talent received on the videoconferencing software, mentioned below. Additionally, it can be eliminated in embodiments in which playback is done remotely and the mini recorder 126 is omitted.
   F. Teamviewer—Allows Mission Control operator to control Crew In A Box remotely over the Internet. This can be substituted with other remote desktop software.
   G. Zoom—Videoconference software that allows everyone in the session to view the talent using unit 100 live. Also allows talent to see video of the director or anyone in the session while they are looking directly into camera. This can be substituted with other videoconferencing software.
   H. Backup Custom Coded Camera Control—backup program that gives the ability to record trigger the camera as well as other camera functions. Further description of this software appears below.
   J. Teleprompting software (e.g., Power Prompter or the like) that appears on unit 100 so talent can read a script while looking directly into camera. Any teleprompting software can be used.
   K. Rogue Amoeba Loopback—Routes audio between programs, inputs, and outputs to eliminate echo and audio feedback.

Camera control B and H further details

In camera control B, two programs were developed. One communicates to and from an Arduino compatible microcontroller, which is connected to the computer through USB. The other program communicates to and from the microcontroller and the camera by Bluetooth. FIGS. 10-15 depict and describe exemplary screenshots of camera control software B in accordance with an embodiment of the invention.

Figure 16:
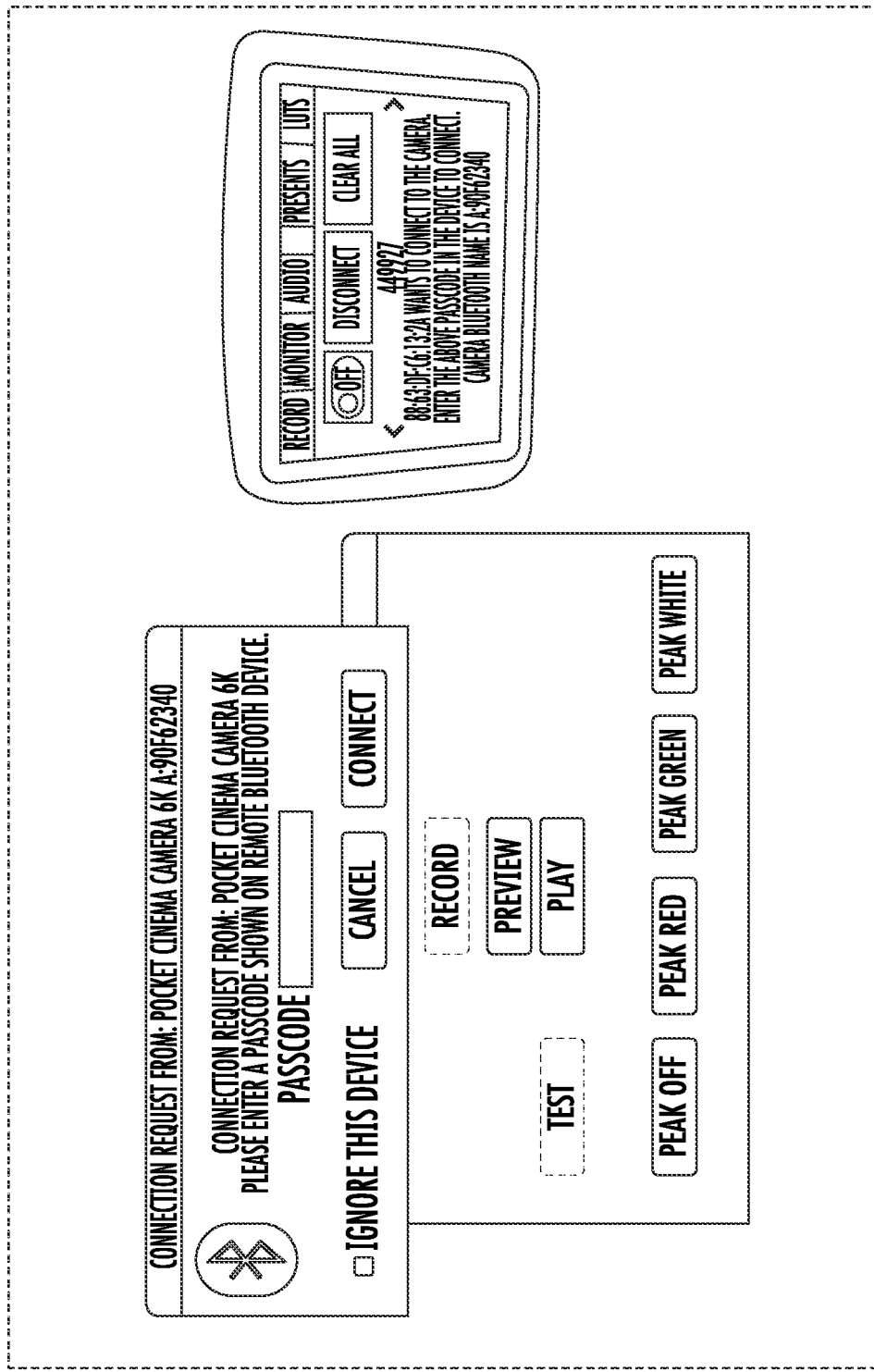
FIGS. 16 and 17 are exemplary screenshots of a custom camera control software interface in accordance with an embodiment of the invention.
Figure 17:
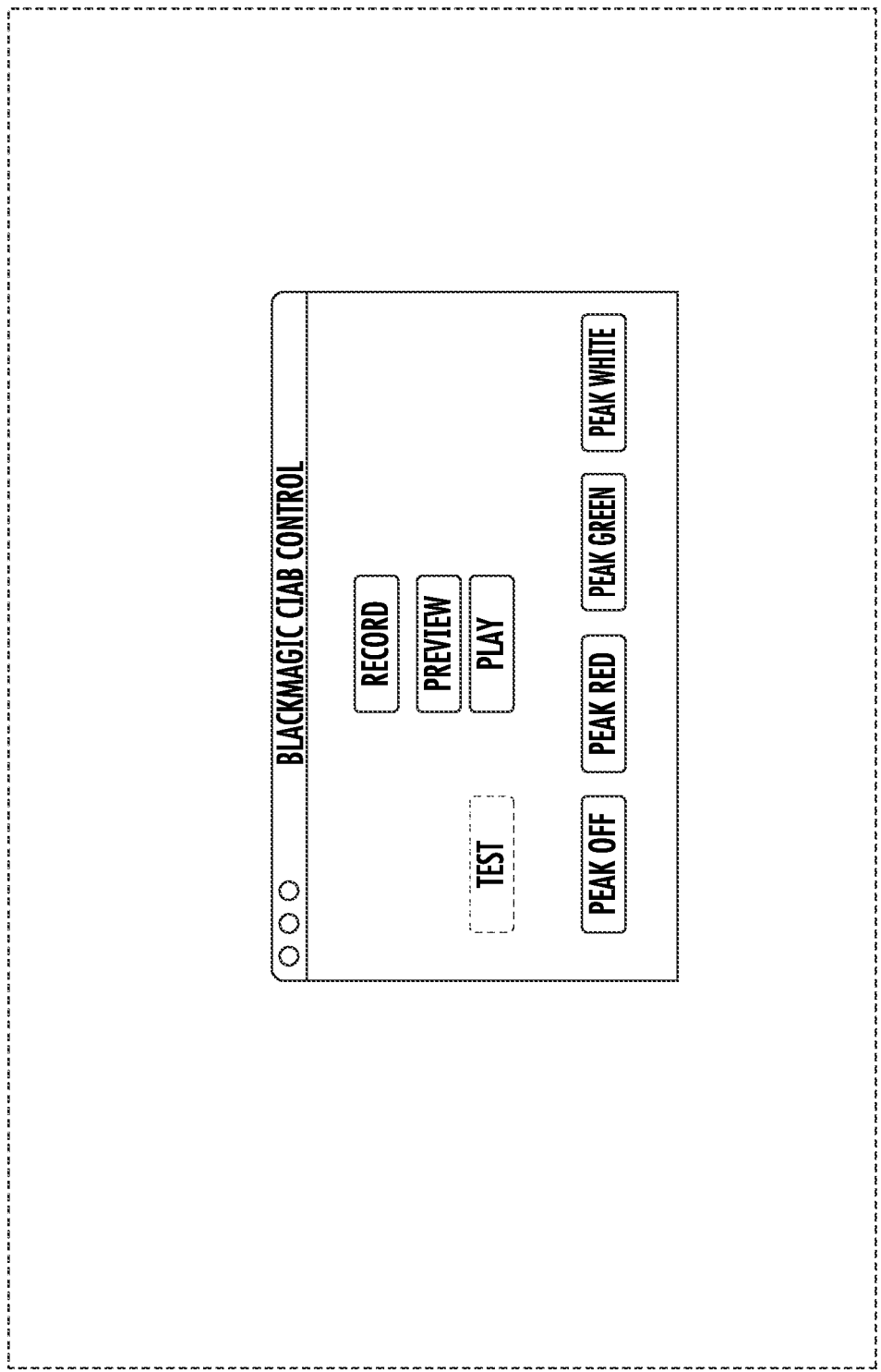

In camera control H, this solution bypasses the need for an Arduino. The inventors took a program that Blackmagic supplied that comes with the Blackmagic SDK, which allows a computer to communicate with the camera through Bluetooth and expanded on it to add functionality. FIGS. 16 and 17 depict and describe exemplary screenshots of camera control software H in accordance with an embodiment of the invention.

Controls B and H add functionality to unit 100 in several ways. The Blackmagic ATEM Mini Pro switcher camera controller 124 is a piece of hardware that when combined with a piece of Blackmagic software, allows the user to control certain camera functionality through an Ethernet connection. Also, if you connect a solid state hard drive to the ATEM through its USB port, it allows you to also trigger the record function on the camera, which is the only way to record the highest quality files to another SSD, that is attached to the camera. The SSD attached to the ATEM only exists to unlock that functionality.

However, to achieve the intended functionality of the invention, the ATEM's USB port needs to be connected instead to the computer. When doing so, Zoom recognizes the ATEM as a webcam, which is necessary for the operator, director, and all clients, in order to run the session and see everything that the camera sees live. So the inventors needed to find another way to trigger record on the camera, while the ATEM's USB port is connected to the computer. Hence software B and H outlined above. As a result, improved functionality over what the ATEM software offers for the invention is added.

Figure 18:
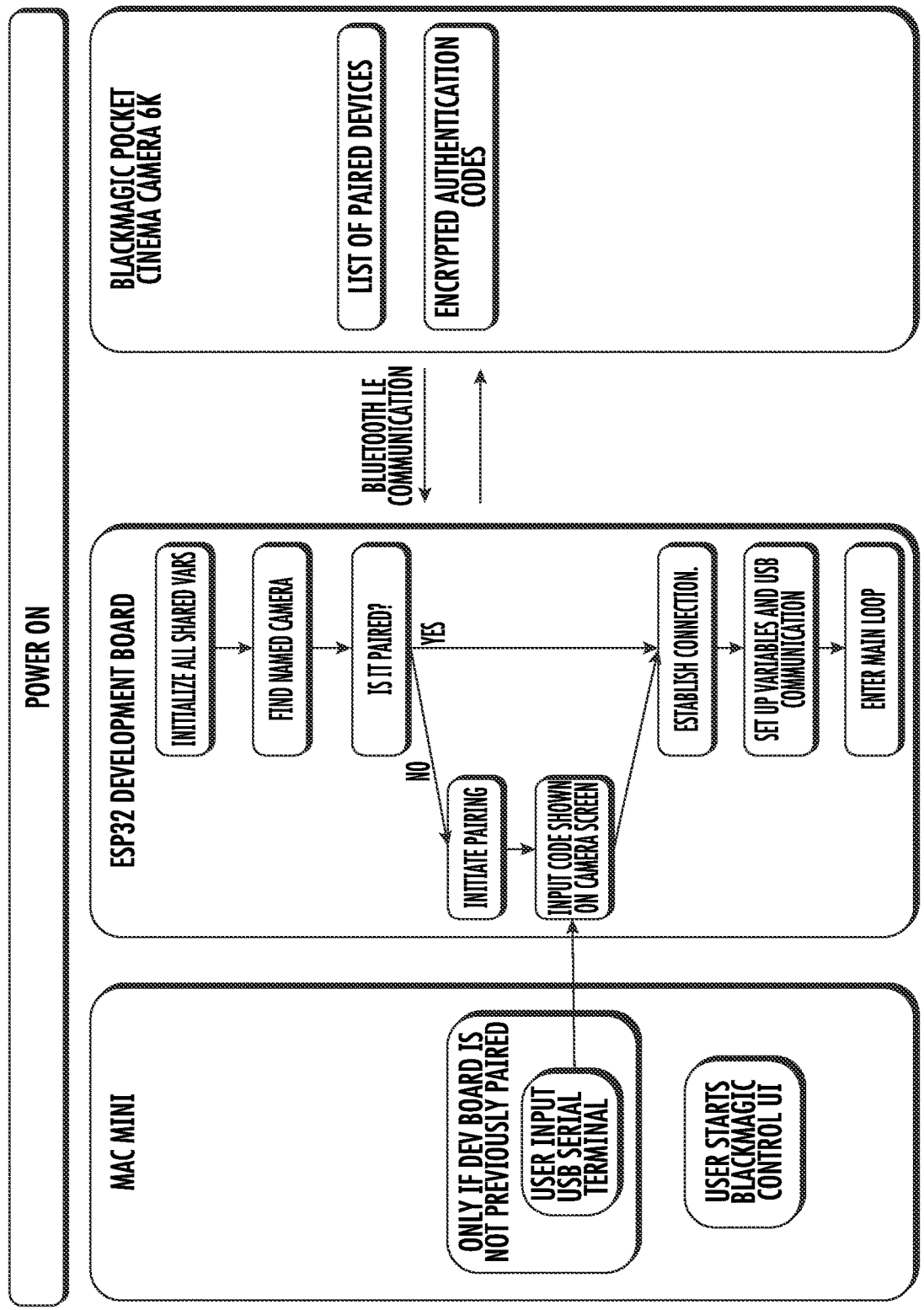
FIGS. 18-21 are exemplary software flowchart diagrams for several aspects of a remote video production apparatus in accordance with an embodiment of the invention.
Figure 19:
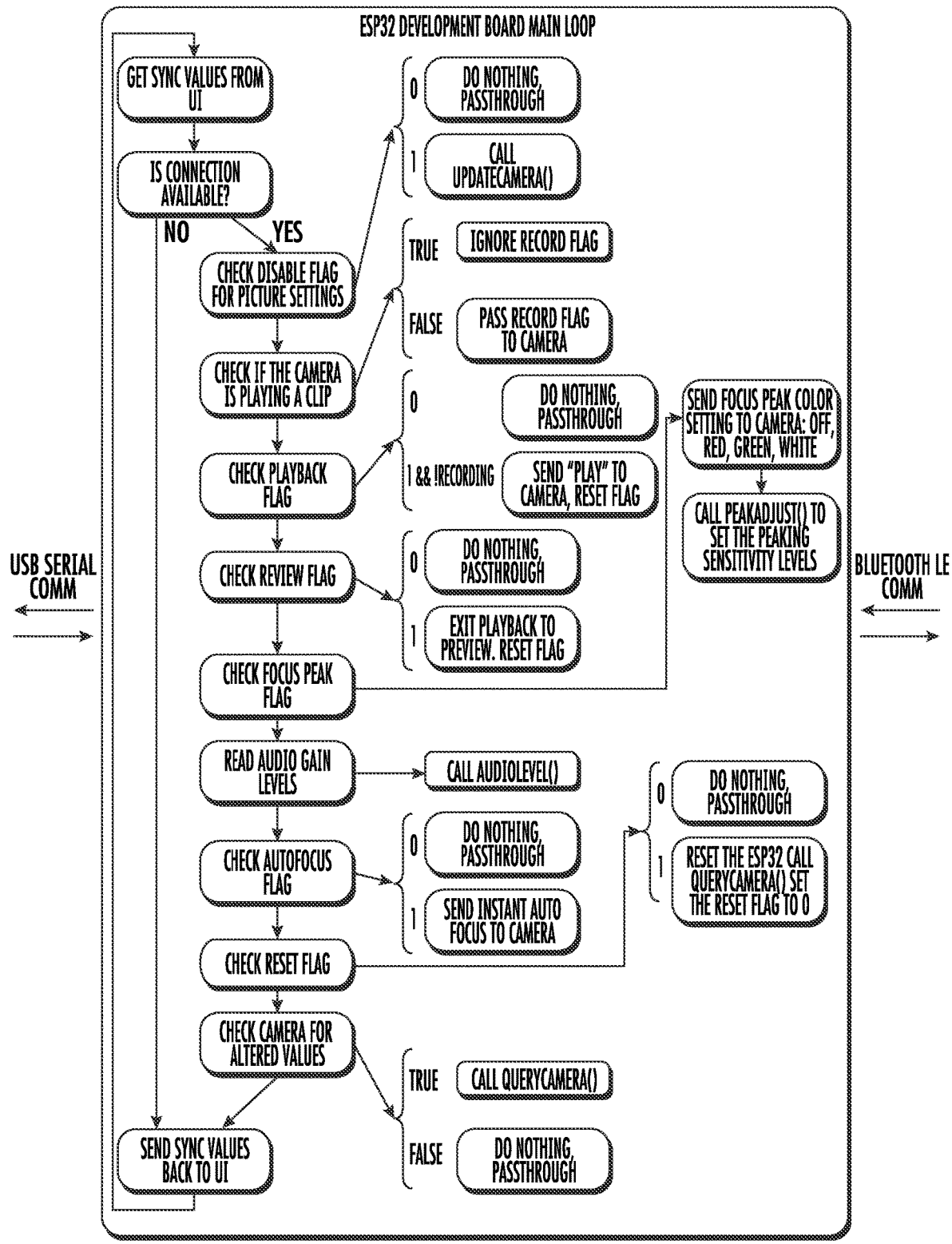
Figure 20:
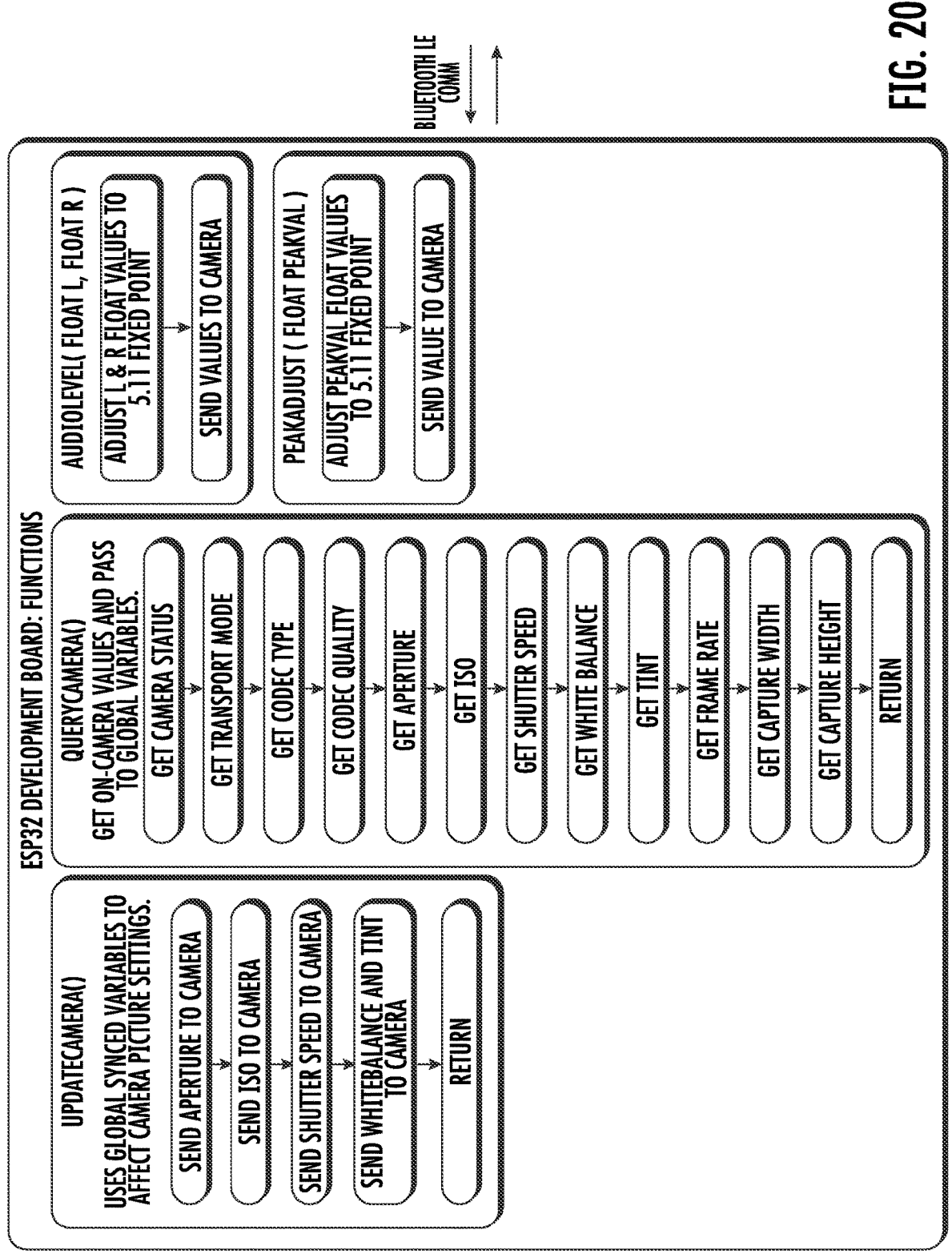
Figure 21:
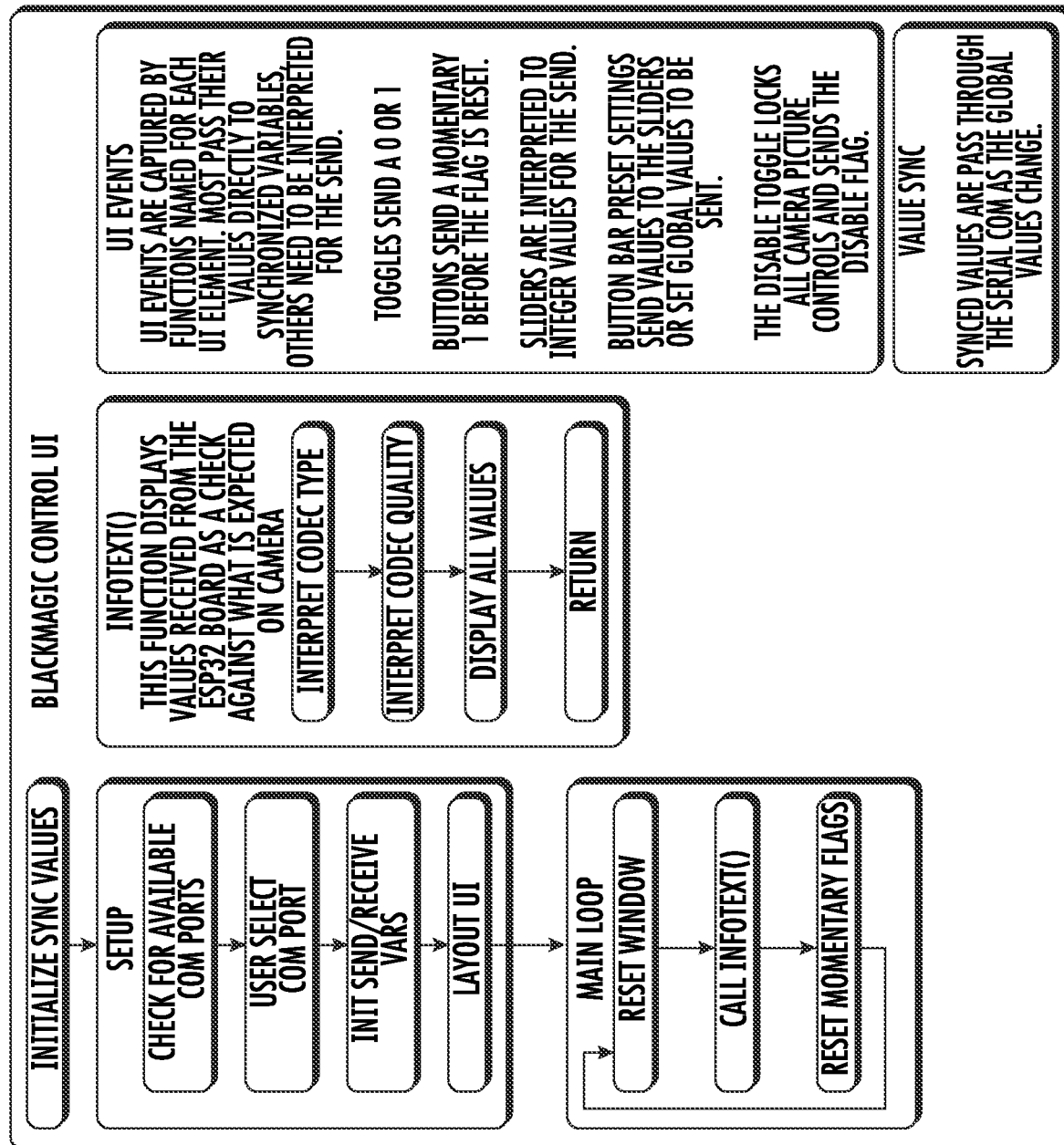

Several aspects of an embodiment of the software functionality are depicted in the flow charts of FIGS. 18-21. FIG. 18 depicts the software logic flow in connection with powering the unit on. FIG. 19 depicts the software logic flow in connection with the main loop of the ESP32 Development Board, aka Arduino microcontroller 128. FIG. 20 depicts the software logic flow in connection with several functions of Arduino microcontroller 128. FIG. 21 depicts the software logic flow in connection with the user interface of the custom control software, Arduino compatible microcontroller, and the Blackmagic Camera.

Figure 22:
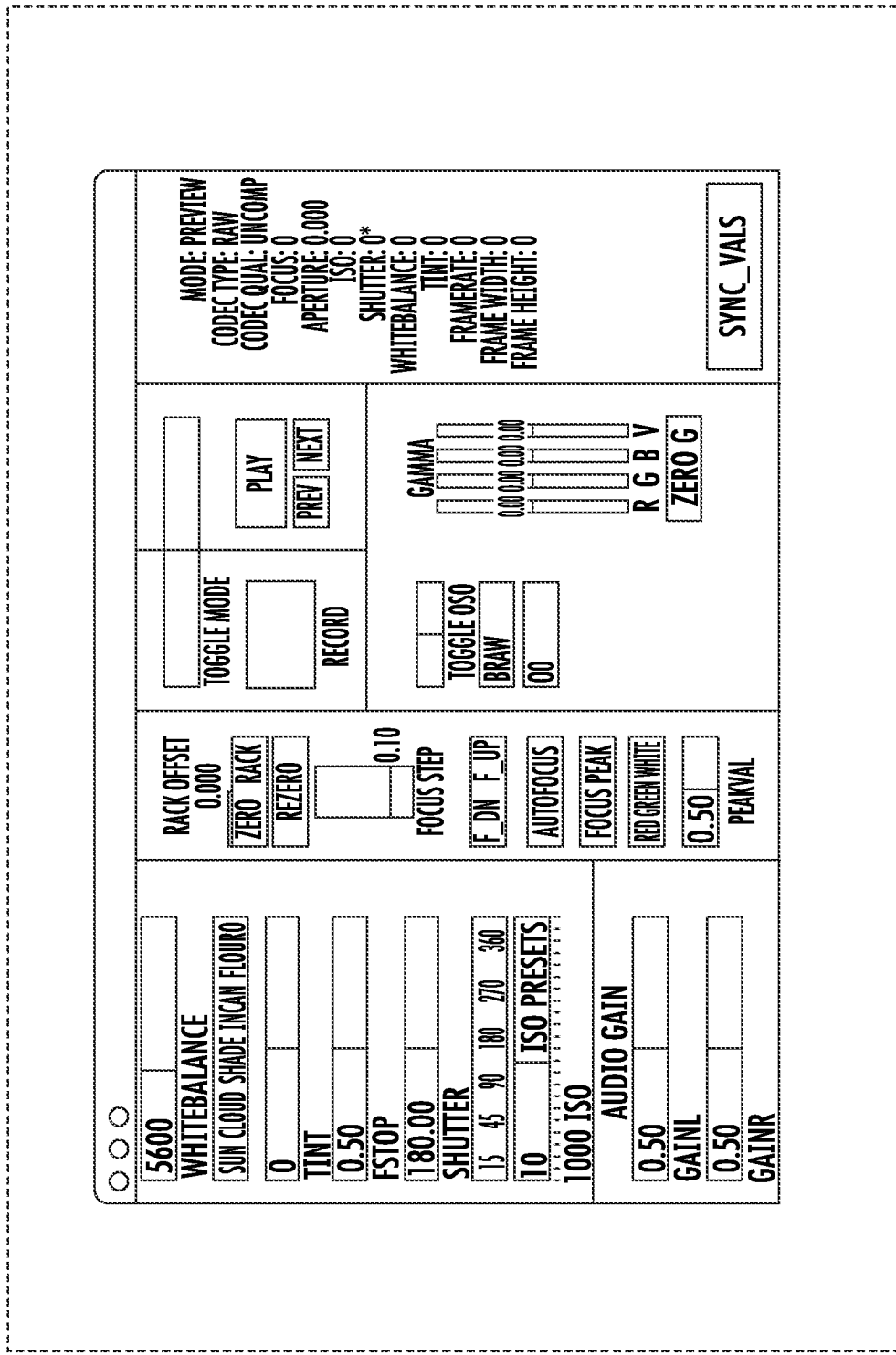
FIG. 22 is an exemplary embodiment of camera control interface in accordance with an embodiment of the invention.
Figure 23:
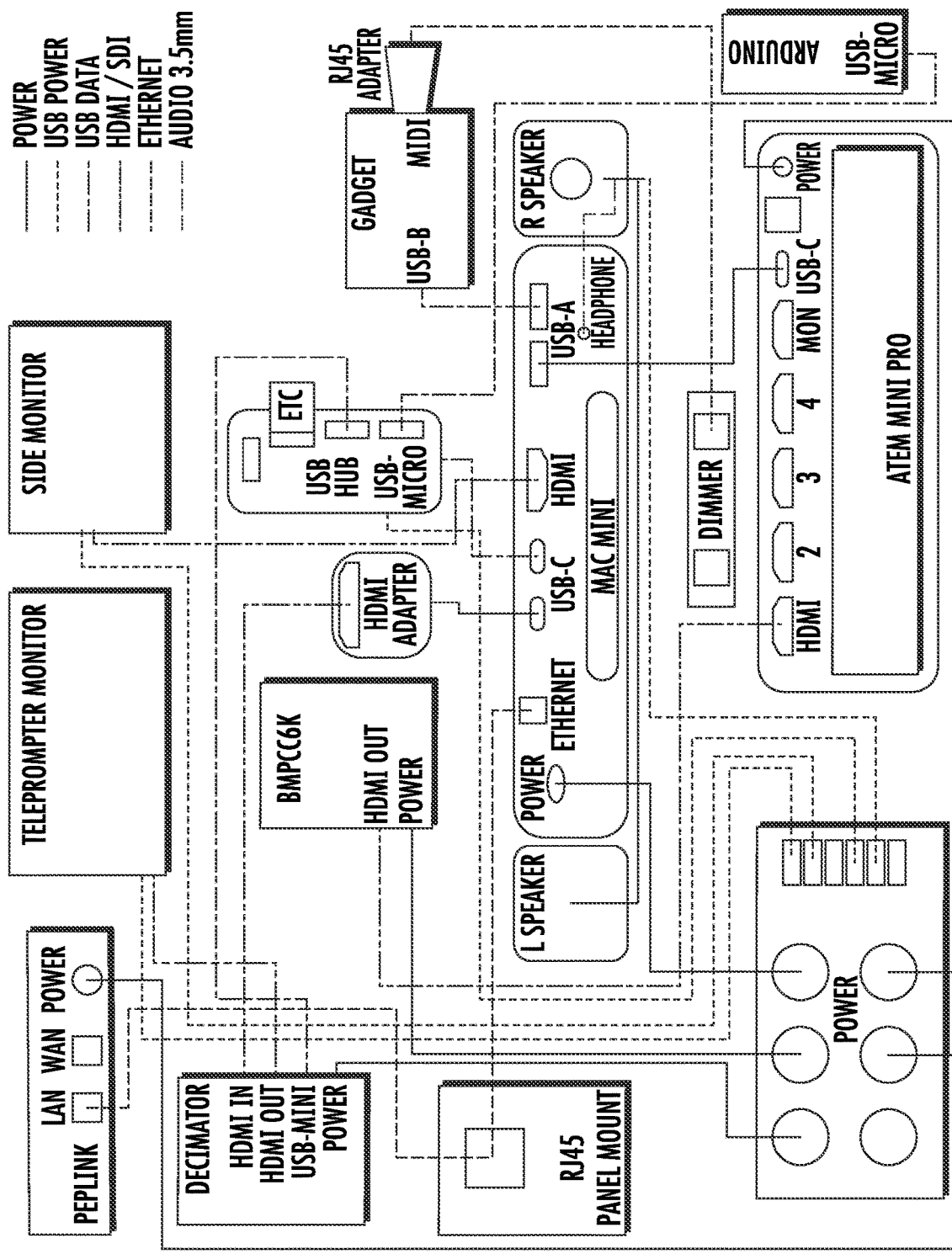
FIG. 23 is an exemplary embodiment of a connection map of the invention utilizing a Blackmagic camera.

FIG. 22 depicts an embodiment of the user interface of the control panel of a device in accordance with the invention. Reference will be made to it below in connection with operational instructions.

One exemplary embodiment of the invention will be referred to hereinbelow as "Crew In A Box" or "CIAB". Operational instructions of this and similar embodiments follow. This embodiment in no way serves to limit the scope of the invention, which is defined by the claims hereinbelow and equivalents thereof. Additionally, reference is made to Zoom teleconferencing software. However, any suitable teleconferencing software can be employed as would be understood by one of ordinary skill in the art. Similarly, reference is made to Team Viewer remote access and remote control software. However, any suitable remote access and remote control software can be employed as would be understood by one of ordinary skill in the art.

Crew In A Box can be unpacked and set up easily, either by a camera assistant or by the on camera talent themselves. Once it's plugged in, the Crew In A Box Operator will remotely control everything within the unit, add it as a participant to the Zoom meeting, and pin a relevant participant or a teleprompting program to the beamsplitter.

All other team members, including Producers, Director, CIAB Operator, VTR Playback, Teleprompter, Script Supervisor, etc. will participate remotely via Zoom teleconferencing software.

Choose A Backdrop With Depth and Light

Look for frame options that place talent 4-6 feet from the camera, and 10 feet or more to the background. Utilizing windows and lamps helps add backlight, shape, and depth. Place the camera at the appropriate height for the subject. Seated talent—place camera in case tray on a 3 ft table or cart. Standing talent—place camera in case tray on case lid on a 3 ft table or cart. If using a tripod, ensure it is rated to hold a weight of at least 80 lbs.

Unpack And Power On

Place the unit with the camera icon facing up, then undo all 8 latches along the bottom. Grab both side handles and pry the large top lid from the bottom camera tray. The lid may be used as a stacking platform for the camera tray. For a sitting subject, a surface 3$ft$ high makes a good base. For a standing subject, 3 ft plus the lid is a good height.

Plug in the AC Power cable, and firmly push the Mac Mini power button to the left (do not press and hold). The computer will make a loud chime when it powers on. Rotate both latch tie downs holding the light in place for shipping and lift the LitePanel array 160 until the magnets 161 on supports 160D connect with magnets 163 on front frame 302 and snap array 160 snap and secure into place. Remove the Velcro catch and unfold the wings (side panels 160A) of the light 160 to face all three panels 160A, 160B forward.

Connect Microphones

Place the boom mic peg in the hole under the light panel and connect to CH1 via the 1.5 ft XLR cable, or place it on a boom pole or mic stand and use the 20 ft XLR cable. Connect the lavalier mic to CH2 using the 10 ft XLR cable.

Detach the side monitor (optional) If you wish to use the side monitor for an off-axis eyeline, remove it from the side by prying the monitor out from its bottom corners, then pulling down and away from the unit. Unfold the magnetic kickstand attached to the back and form it into a triangle.

5. Connect to Wi-Fi or Ethernet

ETHERNET

If a Peplink is installed, the LAN will be connected to the LAN port next to the XLR inputs. An Ethernet cable can be connected to the WAN port on the Peplink, which will pass through to the LAN port, or it can be connected directly to the LAN port next to the XLR inputs.

WIFI

To connect to Wi-Fi, locate and unfold the keyboard. Get the keyboard close to the computer and press Bluetooth 1 to connect and control the computer. Click on the Wi-Fi icon in the top menu bar, then connect to your network. Alternatively, you can ask the operator to connect to Wi-Fi remotely by giving them the login credentials.

Reload The Camera Media

The 4 slot caddy can be loaded with up to 4 2 TB Juggler SSDs and formatted during prep. Connect the USB-C cable between the camera and the first SSD, it will mount to Media Slot 2. Once full, disconnect the cable from the SSD and connect it to the next SSD. In 6K 24 fps BRAW with 5:1 Compression a 2 TB SSD has 220 mins of runtime. Consult section 4.5.4 for additional record times.

Zoom Settings For Participants

Here are some best practices and settings for the participants watching the production. Note that settings for Mission Control and the Crew In A Box unit are detailed below.

Before The Shoot: Downloaded/update to the latest version of Zoom. Sign into your Zoom account. Wear headphones—they help prevent feedback.

Zoom Preferences: Set your application preferences in the following manner:

On the VIDEO TAB, make sure: "Hide Non-Video Participants" is CHECKED "Spotlight My Video When Speaking" is UNCHECKED On the AUDIO TAB, make sure: "Press and hold SPACE key to temporarily unmute yourself" is CHECKED This prevents accidental sound leakage in the conference from being recorded by the camera. If you want to talk, you will need to hold down the SPACE BAR.

On the SHARE SCREEN TAB, make sure: "Enter Full Screen when a participant shares screen" is UNCHECKED. "Maximize Zoom window when a participant shares screen" is UNCHECKED "Scale to fit shared content to Zoom window" is CHECKED. "Side by Side Mode" is UNCHECKED.

Zoom Software Controls

A button on the upper right toggles your view between Gallery View and Speaker View. Gallery view reveals the video window of each person in the session. Speaker View only shows one person's window full screen, and by default, is set to switch to the current speaker.

You will likely want to see the camera output for most of the session. To enable this, go to Gallery View, locate the camera feed window labeled CREW IN A BOX, and click on the 3 horizontal dots on the upper right of that window. Then click Pin Video, which will make that person your primary view.

If a teleprompter is being utilized, when we switch to the prompter for talent, it will likely replace your view of the CIAB monitor. In order to get the CIAB monitor back, click on the button with a picture in picture icon on the upper right of the Zoom application that says Swap Shared Screen. This will return the CIAB monitor to your primary view.

Production Protocols

Session Setup

Once the CIAB unit is connected to the Zoom session, the director will join the conference and will appear on the CIAB Interrotron to set the frame, tweak lighting, and talk to talent. Once the frame is to the director's liking, everyone else joining the session will be admitted.

Session Start

There are often many participants in a shoot, so once joining the session, it is helpful to rename yourself using not only your name, but also your position or title in parentheses. For instance: Your Name (Position). You can do this by going to VIEW and selecting SHOW MANAGE PARTICIPANTS. Find yourself in the list, click on MORE, and then RENAME. After people introduce themselves and pleasantries are exchanged with talent, everyone in the session, aside from the director, should turn off their video.

Communication

Just like a typical shoot on set, it is best if all feedback regarding performance and the image is filtered through a singular voice, which is usually the director. The method to do this is your choice. There is a chat window within Zoom that allows you to send a message to everyone on the conference or to individuals in the conference. Feel free to utilize this function. Talent will not be able to see the chat.

You can also set up group chats using any messenger app of your choice, or with a conference call over the phone, which works well since everyone is muted on Zoom unless they press the spacebar.

The CIAB operator will be in direct contact with the CIAB producer during the session, but will likely not be able to observe or participate in any chat conversation, due to the need to place full attention on the live feed and controls.

Playback

It is best to notify the CIAB producer or operator before the shoot about whether you prefer talent seeing playback or not, as a default. During the shoot, you can change your mind by asking the operator to join you in a breakout room. Playback of a take can be performed at any time, either directly from the camera or from a recording of the session. If you see a stutter or glitch during a take, it is likely a result of Internet buffering, and not something that will have been recorded to camera. However, if you're concerned, ask for playback directly from the camera, and you will be able to see if it was recorded or not.

Notes For Directors

It is best to place yourself in a darker environment, or at least make sure that there are no hot spots in your frame. Because the camera is shooting through teleprompter glass, bright spots may reflect back into the camera and impact the image negatively.

The Crew in a Box experience is seamless for talent, but as with all remote shoots, there are sometimes technical issues to be worked out, and conversations that need to happen away from talent. It is best to explain at the start of the session that things may take a little longer than they're used to on a traditional set, and that you may be stepping away from the conference at times to chat with the crew, agency, or client.

You should view communication with talent, crew, and agency/client the same way you would on set. If you feel comfortable saying something in front of everyone, simply communicate in the main session.

However, for any conversation you would like to be more private, request a breakout room. You might want to assign someone on your team to "entertain" the talent while you're away, or you can tell talent they can step away if you think the conversation will be longer.

If talent does step away, and a lavalier microphone is already attached to them, it might be best to have them disconnect the mic from the unit instead of detaching the microphone from their clothes. Use your judgment when seeing how long it takes them to initially mic up.

Let the CIAB operator know whether you'd like your image to be on the Interrotron when rolling or not.

For framing, it is best to position the box to the background and then have the talent move into that frame. The CIAB operator can adjust focus if needed, but it is best to tell talent to not move forward or backward too much once focus is set, especially in situations where depth of field is limited.

If the Zoom feed gets choppy in the middle of a take, it is most likely due to Internet connectivity, and the take is likely being recorded without issue locally in the box. Let the take finish and tell the operator that the take was choppy (though they will likely already know). Feel free to request playback to ensure the take was fine.

If talent is wearing glasses and reflection of the light is an issue, ask them to push the glasses down their nose slightly and look down a bit. As with any shoot, it's best to plan ahead and ask talent to wear anti-reflective lenses.

Breakout Rooms

At any time, you are able to request a breakout room, and identify the people you would like in that room. Breakout rooms remove participants from the main session and place them in a separate room where they cannot be seen or heard by anyone else in the main session. Breakout rooms are recommended for more private conversations like: Client/agency discussions with the director about performance/image notes, that should take place away from the talent and others on the session; more sensitive conversations about performance that the director has with talent; conversations between the director and DP/CIAB operator that you do not want the greater group to hear. Once the breakout room conversation is complete, you can rejoin the main session by clicking on the blue button at the lower right of your Zoom application window.

Suggested Teleprompter Setup

The Crew In A Box Interrotron beam splitter is a 720p second desktop for the Mac Mini, running through a Decimator MD-HX that horizontally flips the image. The CIAB Operator can drag any window onto this desktop, and it will automatically appear correct to the talent. This means any content can be shared with the talent, via Zoom desktop sharing or other methods. It is therefore recommended that the teleprompter operator runs the teleprompter software on one machine, sharing it to Zoom as the Teleprompter participant, and uses a second machine to participate as the Teleprompter Operator viewing the talent in real time.

Suggested VTR Playback Setup

For playback from camera, short takes are recommended as there is no remote way to scrub forwards or backwards through takes. For advanced Video Tape Record (VTR) setups, it is recommended that the Zoom feed is recorded to a separate device that can play back to a capture card, allowing it to both capture the Zoom feed and playback as its own participant.

A simple VTR setup would include a laptop to run Zoom, a Atomos Monitor/Recorder, and an AJA U-Tap or other HDMI capture device.

The HDMI out of the computer will be connected to the HDMI In of the Monitor/Recorder, which will appear as a second desktop. Either mirror desktops or configure Zoom for dual monitors with the camera feed pinned to the second monitor to be recorded. Connect the HDMI out of the Monitor/Recorder to the HDMI In of the U-Tap. Connect the U-Tap to the computer over USB. Set the U-Tap as the Zoom camera source and audio source, so that on playback it will be viewable to the other participants.

Camera Prep by Remote Crew Prior to Delivery

Record Resolution

Record Resolution 6K Full Sensor BRAW 5:1—each hour of footage is 600 GB and will take an hour and ten minutes to download to shuttle drives at 140 MB/s.

1. Menu button (looks like three stacked lines)
2. Record tab
3. Codec—Blackmagic RAW
4. Quality—Constant Bitrate
5. Compression—5:1
6. Resolution—6K 6144×3456

Focus Assist
Focus Assist On to HDMI
1 Menu button (looks like three stacked lines)
2. Monitor tab
3. HDMI tab
4. Focus Assist: ON
5. Clean Feed: OFF
6. Frame Guide: ON
7 Both tab
8. Focus Assist: Colored Lines
Frame Guide
16×9 Frame Guides
1. Menu button (looks like three stacked lines)
2. Monitor tab
3. Both tab
4. Frame Guides: 16:9
Format SSD Media Media should be prepped ahead of the shoot so Run/Stop can be tested, and formatted prior to first shot. Note: Camera media can be formatted ExFat or HFS+. ExFat can be downloaded on both Mac and Windows. HFS+ is natively supported on Mac, but not Windows.

1. Connect SSD 1 via USB C cable—it will mount in media slot 2
2. On camera home screen, tap media slot 2 in the bottom center of the screen
3. Tap Format Drive
4. Tap Edit Reel Number
5. Set Reel to 1 for the first drive, the number will increment for subsequent drives
6. After formatting is complete, disconnect the drive and connect the next
6.1. Note: There is no eject or unmount, it is safe to pull
7. Format any additional drives
8. Reconnect the camera to Reel 1 when ready to start shooting Map Microphone Camera Audio Channels During prep, the microphones should be mapped to the correct input channels on the camera. This can only be done via the camera touchscreen, but shouldn't ever need to be changed.

Gain for properly mapped microphones can be controlled via CIAB Camera Control, but it is critical to connect microphones to the correct channels and map them correctly in the camera menu.

1. Click Menu button on camera—looks like three stacked lines
2. Click Audio tab
3. Set Channel 1 to XLR +48V-Mic
4. Set Channel 2 to 3.5 mm Right-Mic
5. Plug boom mic into XLR CH 1
6. Plug lavalier mic into XLR CH 2
7. Connect headphones to camera body
8. Verify tapping on boom mic is heard in left ear
9. Verify tapping on lay is heard in right ear
10. Visually verify levels for both channels are in the green
11. Click Menu button to return to camera home screen Once properly configured, channel gain can be adjusted remotely with CIAB CCP.

Adjust Speaker Volume

Local crew: Power on the speakers and adjust the physical volume knob to MAX
1 Turn on the speakers using the switch located on the back of the right speaker
   Position 1—OFF/Blue LED OFF
   Position 2—ON/Blue LED ON
   Position 3—ON/Blue LED OFF
2. Increase the speaker volume by turning the volume knob clockwise
   Best practice is to leave the physical volume at MAX
   Volume can then be lowered remotely via the computer interface Remote crew: Volume can be virtually adjusted via the Mac mini remotely over Team Viewer.

Set Timecode

The camera supports two modes of timecode.
1. Free Run—forward running timecode is always output, usually sync'd to time of day.
2. Record Run—forward running timecode is output only while the camera is recording. To toggle the timecode mode, tap on the timecode at the top middle of the camera's touch screen.

To change the time of day for free run timecode, change the Mac mini system time and reboot the entire CIAB (disconnect AC power). When the system restarts the ATEM Mini should update the camera's time of day using the Mac mini system settings.

1. Apple button in upper left corner
2. System Preferences
3. Date and Time
4. Click Lock
5. Enter admin password
6. Time Zone Tab
7. Change Time Zone Alt
1. Click time in upper right corner
2. Click Open Date and Time Preferences . . .
3. Click Lock
4. Enter admin password
5. Uncheck Set Date and Time Automatically
6. Adjust time Remote Procedure Once the Mac Mini is powered on and connected to the internet, it will appear in Team Viewer allowing for remote control.

The following steps should be performed remotely by the Crew In A Box Operator, but can also be performed locally using the Bluetooth keyboard and trackpad.

The following constitutes a Prep Checklist to ensure proper functionality of the unit.

Team Viewer

Connect to the Crew In A Box via Team Viewer on your machine.
1. Double click on device
2. 'Connect using password'
   Only launch one instance
   Set speaker volume
Verify the sound is loud and clear.
1. Set computer sound to External Headphones
2. Increase the volume to MAX or whatever volume is deemed appropriate
2.6.3 Test the camera control software
Ensures the Bluetooth connection between the computer and camera is working properly.
1. Open CIAB ControlPanel from dock
2. Enter b as the COM port and click OK
3. Click AUTOFOCUS
4. Verify the camera and lens autofocus correctly
5. Click RECORD
6. Verify the camera Record Runs
7. Click RECORD 8. Verify the camera Record Stops Test Lite Panel Check both light emitters since they are different channels (warm/cool).
1. Open ETC Eos Family Welcome Screen from dock
2. Click Primary button to launch ETCnomad
3. Select Ch 1, Ch 2, and Ch 3 to control all 3 panels together
4. Click Popup ML Controls—third button from the right along the top
5. Click Max in the Intensity column
6. Click Max in the Cool column
7. Click Max in the Warm column
8. Verify with talent or AC that both tungsten and daylight emitters active on all panels
9. Click Min in the Intensity column to turn off light
10. Close ETCnomad before shutting down computer otherwise shutdown will stall Set microphone gain levels With talent or an assistant speaking into the microphones, adjust the gain to land at −12 db
1 Adjust Boom mic gain
2. Adjust Lay mic gain Set fan to max Prevent the Mac Mini from overheating.
1 Click on the temperature in the top bar
2. Click on Fans
3. Click on Max ATEM Control—Switcher Open ATEM Software Control from the dock and verify connection
1. Restore LUT
1.1. File>Open>restore
1.2. Or manually adjust Gamma
2. Switcher—Mixer
2.1. Enable microphone(s)
2.2. Enable/adjust dynamics Launch Zoom
1. Ask talent to mute & turn down phone
1.1. If talent can't hear, verify remote computer not muted
2. Find Email & click link
3. Drag Zoom interface to 2nd monitor
3.1. If unavailable, look for enabled monitor swap icon
3.2. Troubleshooting:
3.2.1. Turn on local prompter monitor
3.2.2. Reseating red HDMI cable from decimator to monitor START VIDEO
4.1. Toggle to 2nd monitor
4.1.1. Maximize Zoom window (Option+)
4.1.2. Video & Audio should be toggled to share Shooting
1. Set Up Camera
1.1. Check codec—5:1
1.2. Iris/Shutter/WB/ISO (1000 preferable max)
2. Lighting
3. Body Mic
3.1. Plug Body Mic into RED XLR cable (on camera left)
3.2. Check Sound Levels
4. Switching
4.1. Turn off Boom Mic (channel 1) in ATEM
5. Playback
5.1. Toggle to Playback
5.2. Check camera settings in playback
5.3. Confirm original camera settings when returning to LIVE
6. Monitoring temperature
6.1.190
6.2. Troubleshoot:
6.2.1. Stop sharing Zoom in the box as a reset Shutdown
1. Turn off Lights—in Nomad
1.1. Select all 3 channels & minimum on intensity
1.2. Verify w/talent or AC that all lights are off
1.3. Quit ETC/Nomad ('confirm')
2. Mute remote Zoom
3. Turn off mics on ATEM
3.1. Ask talent to unmute on phone/Zoom
4. Say goodbye's on box
5. Quit CIAB Control Panel
6. Quit Zoom
6.1. LEAVE
7. Shut off local computer from remote Mission Control Remote Methodology—The Crew In A Box Operator will control the Crew In A Box Mac Mini via Team Viewer Software. Once the CIAB is powered on and connected to the internet, the CIAB Op can remotely control all aspects of the camera, light, microphones, teleprompter, and picture feed.

Software Virtualization

All of the components of Crew In A Box can be controlled almost entirely via software, so having a computer at the heart of the Crew In A Box enables remote control for the operator.

Team Viewer—Remotely control the Crew In A Box components virtually.

CIAB Camera Control—Control the Blackmagic Pocket Cinema Camera 6K via Bluetooth, including focus, aperture, and Run/Stop.

ATEM Software Control—Control the ATEM Mini Pro downstream switcher and adjust conference audio mix, camera color, camera frame rate, and add graphics or frame guides.

Eos ETCnomad—Control the three built in LiteGear panels via an ETCConnect USB DMX Gadget and E-Control DMX Dimmer Pack.

Decimator UCP—Control the Decimator scaling options including Horizontal flip.

Pepwave Peplink—Control the Peplink connection priorities and thresholds via a web utility.

iStat Menus—Control the fan speed and monitor key computer health metrics like upload speed and temperature.

Zoom Teleconferencing—Send the camera and microphone feed to Zoom as a participant, and also pin feeds to the interrotron like a scripted teleprompter via a shared desktop.

MacOS—System settings for the host operating system on the Mac mini.

Team Viewer

Team Viewer must be installed on the Mission Control computer to control the Crew In A Box Mac Mini. The Mac Mini should be added as a licensed computer to the account being used at Mission Control.

Adding a computer to Team Viewer Account

Note: A Team Viewer account is required, and the Team Viewer account must be signed in at Mission Control.

Local Crew: Perform these steps in Team Viewer for the Crew In A Box computer
1. Install Team Viewer on the Crew In A Box computer, no login required
2. On the Remote Control tab, note the Team ViewerID and Password 3. Ensure Start Team Viewer with System is checked
4. Check Grant Easy Access checkbox
Remote Crew: Perform these steps in Team Viewer for the Mission Control computer
5. Install and sign into Team Viewer on your Mission Control computer
6. Click the Computers & Contacts Tab, then click the Add button
7. Click Add Remote Computer
8. Enter the Team ViewerID and Password of the Crew In A Box computer, and give it an Alias or name
9. Click the Remote Access tab and add it as a licensed computer Connecting to Team Viewer
Ensure the following two conditions are met:
1—Local: The Crew In A Box computer is powered on and has been added to the Mission Control Team Viewer Account per section 3.2.1
2—Remote: The Mission Control computer is powered on and Team Viewer is logged into the Mission Control Team Viewer Account per section 3.2.1
1. In Team Viewer, click the Computers & Contacts Tab
2. The Crew In A Box computer is under My Computers
3. Double click on the computer to launch Remote Access Switching Between Desktops The Crew In A Box Mac Mini is configured with two desktops, one on the side monitor, and the other visible to talent on the interrotron monitor. If an off camera eye line is desired, the monitors can be swapped or repurposed.

The side monitor appears as OnLap, and the interrotron monitor appears as DECIMATOR because the MD-HX is inline between the computer and the monitor to apply a horizontal flip.

Note: The DECIMATOR desktop should be set to 720p. This is done to minimize load on the computer via System Settings>Displays.

When remotely controlling the Crew In A Box Mac Mini via Team Viewer, you will be notified there are two desktops. You can switch the desktop that you're viewing at any time by clicking Next Monitor in the far upper right corner.

CIAB Camera Control Panel (FIG. 22)

Crew In A Box Camera Control, an exemplary embodiment of which is shown in FIG. 22, is an interface for controlling key aspects of the Blackmagic Pocket Cinema Camera 6K via a Bluetooth USB bridge.

Recommended Settings

6K Resolution—Makes use of entire camera sensor with no cropping

Settings that cannot be controlled by CIAB:
Framerate—Use ATEM Software Control
Format Media—Use Camera Touchscreen
  COM Port
Launch CIAB_ControlPanel software from the Mac Mini dock.

Upon startup, a dialog box will appear to ask for a COM port selection. This port selection allows the software to connect with the Bluetooth control hardware.

You should be presented with a set of lettered options. Look for the option /dev/cu.usbserial-[some ID number] and use the keyboard to select the lettered option presented to the left. In the example above, it's option 'b' (typically it will be 'b' but it's always good to double check)

If no option similar to this format appears, check the cable connections to the Bluetooth hardware.

Sync Vals

Once the UI is running, it is good practice to press the SYNC_VALS button which requests a report from the camera as to the current state of its settings. This is not a necessary step, but it does provide an early check of connectivity.

White balance & Tint Control
These control the camera's white balance and tint.
1. WHITEBALANCE—Drag to select the color temperature.
2. Presets—Select some common preset lighting scenarios to alter white balance and tint at the same time.
3. TINT—Drag to control the amount of tinting present F-Stop Control p0 Controls the aperture of the lens.
1. F STOP—Drag right to close the aperture, left to open it up.
(b). This will be covered later in the manual.
This control's value go from 0-1, not standard f-numbers that you may be used to. While we cannot dictate the f-stop on the lens directly, the camera will return the value to the UI and it's displayed on the right info pane Shutter Control
Control the angle of the virtual shutter.
1. SHUTTER—Drag to directly adjust the shutter angle value.
2. Presets—We have provided a set of common preset values you can choose from as well, click to select.

ISO Control
Adjust the ISO/Gain of the sensor.
1. ISO PRESETS—Drag to directly adjust the ISO over the camera's built in values. The number on this slider reflects the option of choice rather than the ISO directly
2. ISO display—The ISO options are determined by the camera and are locked to discrete values.

Audio Gain Control
Adjust the gain control on the audio channels.
1. GAINL—Drag to adjust the gain on channel 01, values range from 0-1.
2. GAINR—Drag to adjust the gain on channel 02, values range from 0-1.
What feeds these channels needs to be controlled directly on the camera's touch panel (see section 2.5.5).

Rack Focusing Control
These controls allow you to do fine focus control and rack between two preset points.
Focus control with this camera/lens combination is performed through relative rather than absolute positioning of the focal ring. Focusing up and down can only be performed as an offset from the current position, which we can choose to call zero.
1. Rack Offset Value—this number is the 'distance' between the two preset values which can be automatically racked between. It is just a reference number, it cannot be directly edited, but increments based on the other controls.
2. ZERO—this is the focus starting position. The green line above denotes that this is currently where the lens is focused. By pressing ZERO the lens will return to this position.
3. RACK—this is the target offset focal position. Pressing RACK will shift the focus position and slide the green line above this button to denote the change.
4. REZERO—this sets your current focal position to the zero value and resets the 'Rack Offset' value to zero.
5. FOCUS_STEP—drag to adjust this value. This value is the amount of movement the focus will move when using incremental adjustments. A smaller value will move a small amount.

6. F_DN—clicking this will adjust the focus back toward the camera by the amount denoted in the FOCUS_STEP (this control can also be accessed by pressing the ',' key on the keyboard).
7. F_UP—clicking this will adjust the focus away from the camera by the amount denoted in the FOCUS_STEP (this control can also be accessed by pressing the '.' key on the keyboard).

Focus Workflow

First use autofocus (next section) to set your initial focal position. Use F_DN and F_UP to finely adjust the focal plane as needed, adjusting the FOCUS_STEP to gain finer control. If your subject leans forward or back, a few taps on those buttons can allow you to ride the focus and keep your subject sharp. If you need to make a more dramatic and/or timed rack focus, first focus on your first subject. Then hit REZERO to set that position. Use F_DN or F_UP to find your other focal position. You can now press ZERO and RACK to move between those two focal marks as needed.

Auto Focus Control

Press this to activate the center-weighted autofocus.

Focus Peaking Control

Activate and adjust OSD focus peaking.
1. FOCUS_PEAK—Press this to toggle focus peaking on and off.
2. Color Selector—Peaking color can be toggled between red, green, or white.
3. PEAKVAL—Dragging this value adjusts the sensitivity of the peaking display. It adjusts to low, medium, or high.

If you don't see any focus peaking on the display, you need to ensure that it is activated to be seen through the HDMI out. That needs to be set using the on-camera touch screen.

Record and Playback Control

Toggle between modes, record your footage, and review what was shot.
1. TOGGLE_MODE—Switch between preview/record mode and playback. Subsequent controls will activate/deactivate.
2. RECORD—Records to the SSD. Press once to start, press again to stop. Works only when in Preview mode.
3. PLAY—Plays the currently displayed clip. Works only in Playback mode.
4. PREV—Moves to the previous clip on the SSD. Works only in Playback mode.
5. NEXT—Moves to the next clip on the SSD. Works only in Playback mode.

The playback mode can perform two different ways, it will either play a single clip or it will continue to play through all clips. This setting can be switched only on camera in the Setup section of the camera settings.

On Screen Display Control

Toggle the on screen display (OSD) on and off. This affects the OSD on the HDMI feed—which is what you and the client see. It does not affect the rear display of the camera.

Compression Control

This section allows you to switch between levels of compression within a format.

The upper dropdown menu (shown here as BRAW, this is the Compression Type) alters what the lower menu displays (shown now as Q0, this is the Compression Quality). You cannot change the Codec Type from these controls, that must be set on the camera ahead of time. However you can switch between the available Compression Qualities for a set format.

Color Gamma Control

Gamma curves can be adjusted here. These color adjustments affect the viewable image and are stored in clips as metadata, these do not affect the final color of a BRAW image.
1. Color Channels
   R—Red channel, slider values range from −1.0 to 1.0
   G—Green channel, slider values range from −1.0 to 1.0
   B—Blue channel, slider values range from −1.0 to 1.0
   V—Luminance channel, slider values range from −1.0 to 1.0
2. ZERO_G—This button returns all gamma sliders back to zero.

Camera Status Display

The Camera Status Display shows values returned from the camera. These represent the current state of the camera itself. Typically, once these are synced with the UI, there won't be a mismatch. If there is, it could be a sign of a communications error.
1. The next page will have a full review of the displayed variables.
2. SYNC VALS—This button does two things when you press it. It first performs a soft reset of the connection between the controller and the camera. This can potentially alleviate minor connectivity issues. It also requests a report from the camera to populate the data in the status display.

Status Display Overview

Only individual changes are returned from the camera, so the only way to populate all values in the status display is to do a SYNC_VALS. After that, it should maintain parity with the camera.

Mode—will display Preview when looking through the camera, Record during recording, and Playback when reviewing clips.

Codec Type—will display the Type of codec selected. This can only be changed on camera.

Codec Qual—displays the quality setting of the selected codec. This can be changed in the UI to conserve record space if needed.

Focus—this is the returned value from the camera's understanding of where the lens is focused. It's not particularly useful.

Aperture—this is the f-stop value of the lens aperture. This number represents the actual value, as opposed to the slider which is forced to be 0-1.

ISO—sensitivity or gain of the sensor.

Shutter—the virtual shutter angle.

Whitebalance—this is the color temperature applied to the image

Tint—additional tint correction

Framerate—the set frame rate of the camera, this can only be changed on camera.

However this is a useful spot check to ensure proper setup before rolling.

Frame Width—horizontal pixel dimensions of the recorded image.

Frame Height—vertical pixel dimensions of the recorded image.

The invention is not limited to the above description. For example, the case contemplated above outlines the use of one unit to conduct a shoot in one location. However, multiple units can be deployed to various locales and coordinated in the same videoconference session, for applications such as interviews, round table discussions, or the like. Each unit can be controlled by one mission control computer, or multiple mission control computers. Each unit's audio and video feed can be seen by all participants in the videoconference session. The image on each talent's beamsplitter can be configured to only show them live video of the other participants of the on-camera interview or roundtable. Talent will therefore simultaneously be looking into camera at the same time they're looking at the people they're conversing with. The video feed from the camera can then be live-streamed or recorded in a higher quality format to the camera's external SSD or computer's internal hard drive. This use case is not only limited to interviews and roundtables, but any type of shoot that wishes to utilize talent acting together at the same time in multiple locations, such as narrative programming.

The unit can also be utilized to shoot multiple cameras in a single location, feeding each camera through the unit's switcher (currently the ATEM Mini Pro). If multiple cameras are connected, mission control can live switch between them, and that feed will be seen by each person in the session. The live-switched video can then be live-streamed or recorded to the unit computer's internal hard drive. Also, the high quality video from each camera will be recorded to each camera's SSD for the entire session, which enables the program to be edited after the fact in a different way than was originally viewed on the live-switched stream.

Additionally, while the above shows a computer as a separate component from the camera, it is also contemplated that the invention can utilize a camera that incorporates a remotely accessible computing device as part the camera. For example, some cameras (e.g., the RED Komodo) are provided with their own internet protocol addresses. In such a case, the camera and its controls are accessible directly via the IP address. As such, camera control can be remotely effectuated separately from and without a computer.

Additionally, the main monitor is shown as being installed below and in front of the camera lens. However, the main monitor can be alternatively installed above or to the side of the camera lens. In such cases, the beamsplitter will be re-oriented accordingly.

Additionally, the light panel is provided with magnets that are attracted to magnets on the front frame to secure the light array into place. However, other securing mechanisms are also contemplated as being within the scope of the invention, such as Velcro, snaps, latches, and the like.

Additionally, additional lights, microphones, or other peripheral devices can be added to be in communication with the apparatus, such peripherals being preferably remote controllable as above, e.g., via the DMX controller or the like.

Additionally, in an embodiment, audio picked up by the microphone may be fed directly to camera, and levels are remote controlled through the camera body via the computer software. The signal may be fed to the computer for monitoring, not necessarily for processing or recording.

Additionally, the control panel and flow diagrams are not meant to limit the invention. For example the audio level control can be refactored and focus racking can be added, among other things. Also, the control panel can encompass all of the structuring of the camera queries and commands; in such a case, the Arduino microcontroller can be reduced to minimal functionality, e.g., simply to pass data.

An exemplary computing environment in which various embodiments of the invention may be implemented is described herein. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal electronic devices such as smart phones and smart watches, tablet computers, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

An exemplary system for implementing aspects described herein includes a computing device. In its most basic configuration, the computing device typically includes at least one processing unit and memory. Depending on the exact configuration and type of computing device, the memory may be volatile (such as random access memory (RAM)), non-volatile (such as read-only memory (ROM), flash memory, etc.), or some combination of the two. The computing device may have additional features/functionality. For example, the computing device may include additional storage (removable and/or non-removable) including, but not limited to, magnetic or optical disks or tape.

The computing device typically includes or is provided with a variety of computer-readable media. Computer-readable media can be any available media that can be accessed by computing device and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory, removable storage, and non-removable storage are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device. Any such computer storage media may be part of the computing device.

The computing device may also contain communications connection(s) that allow the device to communicate with other devices. Each such communications connection is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. The term computer-readable media as used herein includes both storage media and communication media.

The computing device may also have input device(s) such as keyboard, mouse, pen, voice input device, touch input device, etc. Output device(s) such as a display, speakers, printer, etc. may also be included. All these devices are generally known and therefore need not be discussed in any detail herein except as provided.

Notably, the computing device may be one of a plurality of computing devices inter-connected by a network. As may be appreciated, the network may be any appropriate network; each computing device may be connected thereto by way of a connection in any appropriate manner, and each computing device may communicate with one or more of the other computing devices in the network in any appropriate manner. For example, the network may be a wired or wireless network within an organization or home or the like, and may include a direct or indirect coupling to an external network such as the internet or the like.

Similarly, software is referred to as being "operationally present" on a device, be it a computing device or a peripheral. The term "operationally present" covers the situation where the software is installed on the device and when it is temporarily being run on the device, e.g., from the internet, and then is removed or otherwise disappears from the device after the software is no longer being run on the device. Fully web-based software being run by the device is also contemplated as being operationally present on the device.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as USB flash drives, SD cards, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. A portable remote controlled video production apparatus, comprising:
    a case;
    a computer mounted in said case, said computer having a local portion of remote access remote control software operationally present on said computer;
    a camera mounted in said case in communication with said computer, at least one of said camera and said computer having camera control software operationally present thereon configured to control said camera, said camera having a lens; and
    a light source attached to said case and in communication with said computer, said computer having light control software operationally present thereon configured to control said light source, said light source comprising at least one light panel, said light panel being hingedly attached to said case and configured to fold upward in a use position and fold downward substantially flush with said case in a storage position,
    wherein said camera and said computer and said light source are controllable remotely via a remote portion of said remote access remote control software operationally present on a remote computer communicating with said local portion of said remote access remote control software.

2. A portable remote controlled video production apparatus according to claim 1, further comprising:
    a first monitor fixedly mounted in said case in front of said camera and parallel to an axis of said lens, said first monitor in communication with said computer and receiving display information from said computer; and
    a beamsplitter fixedly mounted in said case in front of said lens, said beamsplitter reflecting light from said monitor towards a front of said case;
    wherein said camera films through said beamsplitter.

3. A portable remote controlled video production apparatus according to claim 1, said at least one light panel having a plurality of LEDs.

4. A portable remote controlled video production apparatus according to claim 3, said at least one light panel comprising at least a central light panel and a side light panel hingedly attached to said central light panel.

5. A portable remote controlled video production apparatus according to claim 4, wherein said central light panel and said side light panel are separately controllable.

6. A portable remote controlled video production apparatus according to claim 1, said light panel further comprising a securing mechanism releasably securing said light panel to said case in said use position.

7. A portable remote controlled video production apparatus according to claim 2, wherein said beamsplitter is mounted at a 45 degree angle to said monitor.

8. A portable remote controlled video production apparatus according to claim 1, further comprising a communication module in communication with said computer configured to enable said computer to communicate with the internet.

9. A portable remote controlled video production apparatus according to claim 8, said communication module comprising at least one of a router or a cellular modem.

10. A portable remote controlled video production apparatus according to claim 2, further comprising a hood, fixedly disposed around said lens between said camera and said beamsplitter, shielding said lens from ambient light.

11. A portable remote controlled video production apparatus according to claim 2, further comprising a signal processor mounted in said case in communication with said computer and said first monitor, said signal processor processing a video signal from said computer to said monitor to flip an image to be presented on said monitor at least one of horizontally or vertically or both.

12. A portable remote controlled video production apparatus according to claim 1, further comprising a plurality of leveling feet respectively attached to bottom locations of said case via respective set screws each accessible for turning from respective top locations of said case.

13. A portable remote controlled video production apparatus according to claim 1, further comprising at least one microphone attachable to said apparatus and in communication with said computer, said computer having microphone control software operationally present thereon configured to control said microphone,
wherein said microphone is controllable remotely via said remote portion of said remote access remote control software operationally present on the remote computer communicating with said local portion of said remote access remote control software.

14. A portable remote controlled video production apparatus according to claim 1, further comprising a second monitor in communication with said computer and receiving display information from said computer, said second monitor configured to be mountable off-axis from said lens.

15. A method of remote controlled video production, comprising the steps of:
providing a case;
mounting a computer in the case, the computer having a local portion of remote access remote control software operationally present thereon;
mounting a camera in the case in communication with the computer, at least one of the camera and the computer having camera control software operationally present thereon configured to control the camera, the camera having a lens;
providing a light source attached to the case, the computer having light control software operationally present thereon configured to control the light source; and
remotely controlling the camera control software and the computer and the light control software via a remote portion of the remote access remote control software operationally present on a remote computer in communication with the local portion of the remote access remote control software.

16. A method of remote controlled video production according to claim 15, further comprising the steps of:
mounting a first monitor in the case in front of the camera and parallel to an axis of the lens, the first monitor in communication with the computer and receiving display information from the computer; and
mounting a beamsplitter in the case in front of the lens, the beamsplitter reflecting light from the monitor towards a front of the case; and
filming through the beamsplitter with the camera.

17. A method of remote controlled video production according to claim 15, further comprising the steps of enabling the computer to communicate with the internet by providing a communication module in communication with the computer, the communication module including at least one of a router or a cellular modem.

18. A method of remote controlled video production according to claim 16, further comprising the step of processing a video signal from the computer to the monitor, said processing step including the step of flipping an image to be presented on the monitor at least one of horizontally or vertically or both.

19. A method of remote controlled video production according to claim 15, further comprising the steps of:
providing at least one microphone, the computer having microphone control software operationally present thereon configured to control the at least one microphone; and
remotely controlling the microphone control software via the remote portion of the remote access remote control software operationally present on the remote computer communicating with the local portion of the remote access remote control software.

20. A method of remote controlled video production according to claim 15, further comprising the steps of:
providing a second monitor in communication with the computer and receiving display information from the computer; and
mounting the second monitor off-axis from the lens.

* * * * *